(12) United States Patent
Johnson et al.

(10) Patent No.: US 10,880,332 B2
(45) Date of Patent: Dec. 29, 2020

(54) ENTERPRISE SECURITY MANAGEMENT TOOL

(71) Applicants: Robert A Johnson, Malvern, PA (US); Michael J DiDomenico, Malvern, PA (US); Philippe Jolly, Hoofddorp (NL); Michael C Leap, Malvern, PA (US); Richard W Phelps, Morrisville, NC (US)

(72) Inventors: Robert A Johnson, Malvern, PA (US); Michael J DiDomenico, Malvern, PA (US); Philippe Jolly, Hoofddorp (NL); Michael C Leap, Malvern, PA (US); Richard W Phelps, Morrisville, NC (US)

(73) Assignee: Unisys Corporation, Blue Bell, PA (US)

(*) Notice: Subject to any disclaimer, the term of this patent is extended or adjusted under 35 U.S.C. 154(b) by 52 days.

(21) Appl. No.: 15/494,852

(22) Filed: Apr. 24, 2017

(65) Prior Publication Data
US 2018/0309788 A1 Oct. 25, 2018

(51) Int. Cl.
H04L 29/06 (2006.01)
(52) U.S. Cl.
CPC .......... H04L 63/20 (2013.01); H04L 63/0263 (2013.01); H04L 63/10 (2013.01); H04L 63/102 (2013.01); H04L 63/104 (2013.01)
(58) Field of Classification Search
CPC ..... H04L 63/20; H04L 63/102; H04L 63/104; H04L 63/10; H04L 41/06; H04L 41/0213;
(Continued)

(56) References Cited

U.S. PATENT DOCUMENTS 7,472,422 B1 * 12/2008 Agbabian ............... H04L 41/06
726/25
8,161,520 B1 * 4/2012 Brunette ................ G06F 21/57
726/1
(Continued)

FOREIGN PATENT DOCUMENTS

CN 101610156 B * 7/2012
CN 105530224 A * 4/2016
(Continued)

OTHER PUBLICATIONS

Axel Kern, et al., Observations on the role life-cycle in the context of enterprise security management, SACMAT '02: Proceedings of the seventh ACM symposium on Access control models and technologies, Jun. 2002, pp. 43-51.*

Primary Examiner — Farid Homayounmehr
Assistant Examiner — Raied A Salman

(57) ABSTRACT

Methods and systems for configuring security management settings within an enterprise network are disclosed. One method includes receiving network concordance data at an enterprise security management configuration tool from a plurality of nodes within an enterprise network, and, based on the network concordance data, classifying each of the plurality of nodes based on an affinitization between the two or more nodes. The method also includes defining a profile for one or more nodes or grouped nodes, and defining one or more solutions within the enterprise security management configuration tool, the one or more solutions each including one or more nodes of the plurality of nodes. The method also includes receiving a deployment selection identifying at least one of the one or more solutions, and, in response to the deployment selection, generating a security settings file describing security settings for each of the one or more nodes.

19 Claims, 37 Drawing Sheets

(58) Field of Classification Search
CPC ............. H04L 41/0681; H04L 67/1097; H04L 67/104; H04L 67/1095; G06F 21/577; G06F 21/604; G06F 2221/034; G06F 21/50; G06F 21/60
USPC ................................................ 726/1, 22, 25
See application file for complete search history.

(56) References Cited

U.S. PATENT DOCUMENTS

| | | | | |
|---|---|---|---|---|
| 8,782,411 B2* | 7/2014 | Nimashakavi | ........ | H04L 9/3213 713/168 |
| 9,549,318 B2* | 1/2017 | Saunders | ............ | H04L 63/0807 |
| 10,122,704 B2* | 11/2018 | Xiu | ................... | H04L 67/2814 |
| 10,505,936 B2* | 12/2019 | Han | ................ | H04L 63/083 |
| 2003/0016655 A1* | 1/2003 | Gwon | ................ | H04L 45/00 370/352 |
| 2005/0235352 A1* | 10/2005 | Staats | ................ | H04L 41/082 726/14 |
| 2006/0013191 A1* | 1/2006 | Kavanagh | ............ | H04L 63/102 370/349 |
| 2007/0152849 A1* | 7/2007 | McConnell | ............ | H04L 41/12 340/963 |
| 2007/0282998 A1* | 12/2007 | Zhu | .................... | H04L 12/1403 709/224 |
| 2013/0110922 A1* | 5/2013 | Shih | ....................... | G06Q 50/01 709/204 |
| 2013/0219456 A1* | 8/2013 | Sharma | ................ | G06F 16/188 726/1 |
| 2013/0219471 A1* | 8/2013 | Brown | ............. | H04W 12/0027 726/4 |
| 2014/0020073 A1* | 1/2014 | Ronda | .................... | G06F 21/31 726/7 |
| 2014/0098671 A1* | 4/2014 | Raleigh | .................. | H04L 69/14 370/235 |
| 2014/0280617 A1* | 9/2014 | Nilsson | ................... | H04L 51/32 709/206 |
| 2015/0046327 A1* | 2/2015 | Taupitz | ................ | G06Q 20/227 705/44 |
| 2015/0242619 A1* | 8/2015 | Bender | .................. | H04L 63/10 726/22 |
| 2015/0295915 A1* | 10/2015 | Xiu | ....... | H04L 63/083 726/7 |
| 2016/0013985 A1* | 1/2016 | Reddy | ................ | H04L 41/5003 726/4 |
| 2016/0065558 A1* | 3/2016 | Suresh | .................... | G06F 21/31 726/7 |
| 2016/0119351 A1* | 4/2016 | Tamura | .................. | H04L 63/10 726/4 |
| 2016/0219038 A1* | 7/2016 | Stephenson | ........ | H04L 63/0884 |
| 2016/0226973 A1* | 8/2016 | Appel | .................... | H04L 67/104 |
| 2016/0307196 A1* | 10/2016 | Achhra | ................. | H04L 63/102 |
| 2017/0090729 A1* | 3/2017 | Nogueira | .............. | G06F 40/284 |
| 2017/0244761 A1* | 8/2017 | Baukes | ............... | H04L 41/0873 |
| 2018/0150890 A1* | 5/2018 | Gupta | ................ | G06Q 30/0609 |
| 2018/0191698 A1* | 7/2018 | Kundu | ................. | H04L 67/306 |
| 2019/0230100 A1* | 7/2019 | Dwyer | ................. | H04L 41/046 |
| 2019/0312887 A1* | 10/2019 | Grimm | ............... | H04L 63/0236 |
| 2019/0392123 A1* | 12/2019 | Larsen | .................... | G06F 21/45 |

FOREIGN PATENT DOCUMENTS

| | | | | | |
|---|---|---|---|---|---|
| CN | 106921636 A | * | 7/2017 | ............. | G06F 21/41 |
| JP | 2016149652 A | * | 8/2016 | | |
| WO | WO-2012174959 A1 | * | 12/2012 | ...... | H04W 12/04031 |

* cited by examiner

ENTERPRISE SECURITY MANAGEMENT TOOL

BACKGROUND

Robust enterprise security software is complex. It often requires installation of specific security software packages at each trusted computer associated with the enterprise, as well as management of various profiles for each of a number of different types of users having differing roles. Furthermore, each server within an enterprise network will typically have a collection of allowed connections external to the network to be managed.

The complexity of enterprise security software increases with the level of security required. For example, in enterprise networks in which data must be secured during intra-network storage and/or transmission, detailed definitions regarding a level of security for each user, types of encryption, permissions, and other policies must be set. Because there are often a large number of computing systems within such an enterprise network, provisioning each system can become so complex as to be time- and cost-prohibitive to install such enterprise security software, or at the very least to exploit its full capabilities. Although network security administrators may find some ways to simplify the deployment of a security solution, for example by creating a template image of security software that can then be customized for each server or endpoint to be provisioned, this still requires each endpoint to be custom provisioned by the network security administrator, which remains time-intensive.

Furthermore, for network security administrators in organizations that are first installing enterprise security software, it can be difficult, if not impossible, to know what specific policies should be created and how to create or deploy such policies within their existing network. Substantial training and weeks, if not months, of deployment/implementation operations are therefore required in many such situations.

SUMMARY

In summary, the present disclosure relates to methods and systems for implementing a secure migratable architecture having improved flexibility, performance, security, and availability.

In a first aspect, a method of configuring security management settings within an enterprise network is disclosed. The method includes receiving network concordance data at an enterprise security management configuration tool from a plurality of nodes within an enterprise network, and, based on the network concordance data, classifying, by the enterprise security management configuration tool, each of the plurality of nodes, wherein classifying each of the plurality of nodes includes grouping two or more of the plurality of nodes based on an affinitization between the two or more nodes. The method also includes defining a profile for one or more nodes or grouped nodes, the profile describing security settings for operation and interactivity within the enterprise network, and defining one or more solutions within the enterprise security management configuration tool, the one or more solutions each including one or more nodes of the plurality of nodes. The method also includes receiving a deployment selection identifying at least one of the one or more solutions, and, in response to the deployment selection, generating a security settings file describing security settings for operation and interactivity of each of the one or more nodes included in the identified one or more solutions.

In a second aspect, a system includes an enterprise security management configuration server comprising a programmable circuit and a memory storing computer-executable instructions. When executed by the programmable circuit, the instructions cause the enterprise security management configuration server to: receive network concordance data at an enterprise security management configuration tool; based on the network concordance data, classify, by the enterprise security management configuration tool, each of the plurality of nodes, wherein classifying each of the plurality of nodes includes grouping two or more of the plurality of nodes based on an affinitization between the two or more nodes; define a profile for one or more nodes or grouped nodes, the profile describing security settings for operation and interactivity within the enterprise network within the enterprise network; define one or more solutions within the enterprise security management configuration tool, the one or more solutions each including one or more nodes of the plurality of nodes; receive a deployment selection identifying at least one of the one or more solutions; and in response to the deployment selection, generate a security settings file describing security settings for operation and interactivity of each of the one or more nodes included in the identified one or more solutions.

In a third aspect, a non-transitory computer-readable storage device having computer-executable instructions stored thereon which, when executed by a computing system, cause the computing system to perform: creating a project in a user interface of an enterprise security management configuration tool; receiving network concordance data at the enterprise security management configuration tool from a plurality of nodes within an enterprise network; based on the network concordance data, classifying, by the enterprise security management configuration tool, each of the plurality of nodes, wherein classifying each of the plurality of nodes includes grouping two or more of the plurality of nodes based on an affinitization between the two or more nodes; defining a profile for one or more nodes or grouped nodes, the profile describing security settings for operation and interactivity within the enterprise network within the enterprise network; defining one or more solutions within the enterprise security management configuration tool, the one or more solutions each including one or more nodes of the plurality of nodes; receiving a deployment selection identifying at least one of the one or more solutions; in response to the deployment selection, generating a security settings file describing security settings for operation and interactivity of each of the one or more nodes included in the identified one or more solutions; and exporting the security settings file to an enterprise management database of an enterprise management server.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
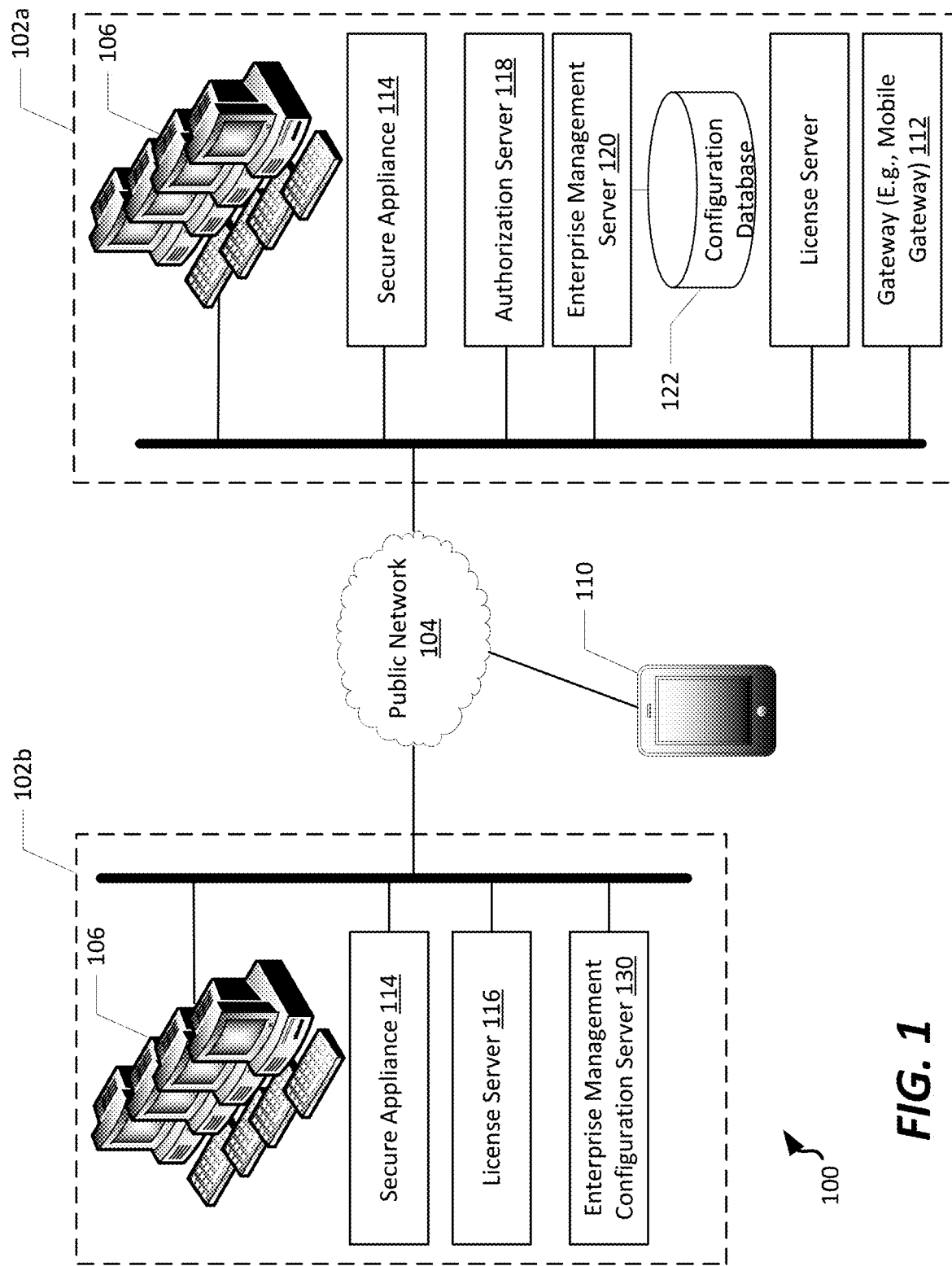
FIG. 1 illustrates a schematic view of an enterprise network distributed across premises, representing an example network in which aspects of the present disclosure can be implemented.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general, the present disclosure relates to an enterprise security management tool that can be used to assist in configuring security settings within an enterprise without requiring a user to have substantial knowledge regarding (1) what types of security settings might be appropriate for each of a number of differently situated endpoints within the enterprise, or (2) whether specific endpoints should be provisioned similarly or differently, where those endpoints might operate similarly, but not identically. The configuration tool described herein, allows for a simply graphical configuration to be made and translated into a format that can be populated to an enterprise security management database, and into an enterprise network.

Additionally, the systems and methods of the present disclosure provide advantages in the area of simplicity regarding setting up and/or modifying security settings for similarly-situated endpoints. This is because, if each endpoint is considered, and graphically depicted, independently, it can be confusing and time consuming to select and modify permissions or other settings properly for all endpoints. By graphically grouping endpoints by affinity and allowing for simplification of a graphical arrangement of those endpoints, modification and provisioning of endpoints is simplified greatly, and made possible for personnel having less knowledge regarding an enterprise's network topology.

In some embodiments of the present disclosure, the enterprise security management tool, or configuration tool, described herein also provides advantages in terms of defining coordinated policies not just for similarly situated endpoints, but for cooperative endpoints, such as user devices, database servers, and associated web servers. In some such example embodiments, the enterprise security management tool can form "solutions" either automatically or by manual manipulation of graphical elements representing such endpoints. Such solutions may correspond, for example, to a collection of functionally interrelated endpoints for which it may be desirable to coordinate security settings. Solutions can be a group of profiles that solve or address a particular problem or service. In example arrangements, such solutions can be arranged in a hierarchy including providers and consumers of data or services, in order. Automatic detection of such solutions can be based, for example, on observed traffic illustrating such functional relationships, and a process by which a root node endpoint) can be defined, followed by interconnected nodes interacting with that root node. The root node can be, for example, a database server, a web server, or other primary source of information with which other nodes interact.

In addition to the above, certain user interface features provide additional guidance and simplicity to a user of the enterprise security management tool. For example, although specific affinity levels or solutions might be automatically defined, manipulation of a graphical user interface to adjust interrelationships among nodes, to group or ungroup similarly situated nodes, to create or decouple solutions, or other movements, can be defined to counteract an otherwise automated or default configuration, such that the manual adjustment is persisted through subsequent manipulations of nodes. Furthermore, the automated and manual manipulations of nodes can represent changes to security settings that are propagated, via underlying metadata, to a security settings file that can be imported into an enterprise security database for purposes of provisioning an enterprise network.

I. Enterprise Security Configuration Server and Environment

By way of background, enterprises implementing security systems in which traffic among nodes within the enterprise network is secured must be configured using complex security policies that are coordinated to ensure that the various endpoints, or nodes, have access to various system resources that may be needed by that node or endpoint. One example of such a security system that can be implemented is the Stealth enterprise security solution from Unisys Corporation of Blue Bell, Pa. Generally, such a system is implemented using an enterprise management server that maintains security policies for various network endpoints, and distributes security policies to those endpoints, in terms of encryption keys that define communities of interest within the enterprise as well as filter lists identifying permitted and forbidden traffic patterns from each endpoint. One particular attribute of the Stealth solution is that for entities not included within a particular community of interest, the resource that is protected using that solution is not visible, and therefore would not be a hacking target (e.g., for DDOS attacks, or other types of attacks) given that its network address would not be known.

As noted above, solutions for creating enterprise security policies, as noted above, are complex. As such, an enterprise security configuration server is proposed to be included in example networks in which such security deployments are performed, which can create solutions for import into an enterprise server for distribution across an enterprise in a straightforward manner. FIGS. 1-5 illustrate example computing systems useable to implement an enterprise network and deploy security settings in such a network, while FIGS. 6-12 generally introduce an enterprise security management tool that includes a configuration user interface that simplifies such design and deployment.

Referring now to FIG. 1, a schematic view of one example enterprise network 100 is illustrated. The enterprise network 100 is distributed across premises, and therefore includes at least a first premises 102a and a second premises 102b separated by a network 104, which can in some cases represent an at least partially public network, such as the Internet. The enterprise network 100 includes a plurality of endpoints 106. The endpoints 106 can be, for example, servers or workstations operable or accessible by a user to perform various tasks germane to the enterprise.

Users of such endpoints in this context may be associated with the enterprise and may be afforded access to computing resources at the endpoints 106; in such cases, different users may have different access rights to data or resources included in the enterprise. Accordingly, users are, via a management system, separated into defined communities of interest (COIs) which allows for common access rights to a group of users. The common access rights may be, in a corporate context, access rights associated with a particular department or project; in other contexts, access rights may be defined by a particular security clearance, membership in a particular group, or having a particular interest in common data or applications.

In the embodiment shown, each of the premises 102a-b have a plurality of endpoints 106 located within the premises. In such arrangements, the endpoints 106 can be interconnected at each of the premises using standard communications equipment (not shown) such as routers, switches, and cabling. In some embodiments, the endpoints 106 can be virtualized endpoints maintained on one or more servers. In such cases, one possible implementation of such an arrangement could be provided using S-Par Secure Partitioning platform provided by Unisys Corporation of Blue Bell, Pa. Other virtualization systems could be used as well.

It is noted that, in addition to endpoints 106 at premises 102a-b, other access mechanisms to the enterprise network 100 may be desirable as well. For example, in the embodiment shown a mobile device 110 may be used to access data or computing resources of the enterprise. In some embodiments, the mobile device 110 can establish a secure connection with a mobile gateway, such as gateway 112 which can act as a proxy for the mobile device 110 within the network, including receiving access to other endpoints within the network based on a community of interest of the user associated with the mobile device 110.

Referring to the premises 102a-b generally, it is noted that in some embodiments, each premises may include a secure appliance 114. The secure appliance can manage secure communications among endpoints 106 or between premises 102a-b. In example embodiments, the secure appliance 114 can be used to deliver encryption keys or encryption features (e.g., a driver with which endpoints can secure data for communication) for endpoints. In alternative embodiments, the secure appliance 114 may not be needed by some or all endpoints; in such arrangements, a native security feature, such as IPsec, could be used by the endpoints to ensure security within a premises 102, or between premises 102a-b generally. In such cases, encryption keys and standards can be defined centrally, for example using the management server described herein, to establish different keys and different communities of interest for use by the authorized users of endpoints across the premises 102a-b.

Additionally, in the embodiment shown, one or both premises 102a-b can include a license server 116. The license server 116 can manage and track license usage by the endpoints 106. For example one or more endpoints 106 may request a license to particular software or to a particular network resource. In such cases, the license server 116 can be contacted to grant or deny a license to such software or resource, based on a number of licenses available and whether the user of the endpoint is authorized to use such software or resource.

Additionally, in the embodiment shown, an authorization server 118 can be provided at one or more of the premises 102. The authorization server 118 can be accessed by an endpoint that is seeking authorization to access other resources within the network. Generally, the authorization server 118 can establish a secure communication session with that endpoint to provide authorization information (keys, settings, COI filters, etc.) to allow that endpoint to communicate with other endpoints within the network.

In addition to the above, a management server 120 is located at one of the premises 102a-b. The management server 120 provides a universally-accessible access location at which management settings can be viewed, enterprise access attempts logged, license tracking can be managed, and security arrangements defined, including definition of encryption policies, communities of interest, enterprise resources available, and other features. Additional details regarding operation of the management server are described in U.S. patent application Ser. No. 14/688,348, entitled 'Enterprise Management for Secure Network Communications over IPSec", assigned to Unisys Corporation of Blue Bell, Pa., the disclosure of which is hereby incorporated by reference in its entirety.

Generally, the management server 120 is communicatively connected to a configuration database 122 (e.g., by hosting the configuration database or being communicatively connected to a separate computing system or systems that host that database). The configuration database generally stores configuration settings included in one or more configuration profiles for the enterprise network; and one or more interface definitions useable by the web interface to provide administrative access to the configuration settings. Details regarding the data stored in the configuration database are provided in U.S. patent application Ser. No. 14/688, 348, entitled 'Enterprise Management for Secure Network Communications over IPSec", the disclosure of which was previously incorporated by reference.

Enterprise management within the enterprise network 100 can be distributed among one or more of the management server 120, authorization server 118, license server 116, and secure appliance 114. Enterprise management provides the general management and control for servers using the Stealth security features of an enterprise network, and in particular Stealth installations that apply IPSec-based security. Each enterprise network, or enclave, can have a management instance that performs various user authentication, logging, licensing, certificate management, administration, web services, and software update features. Regarding authorization, the management service can ensure that a user is authenticated and authorized when logging on to the endpoint 106. The endpoint 106 receives an Authorization Token (AuthToken) that identifies the user's COI membership status.

The management server 120 hosts a management service that can also receive log information to be recorded, and can issue commands to the server to control its behavior or to request status information. This includes retrieving debugging information regarding security software installed through the enterprise. The management service also controls licensing, for example by installing a license System Control Number (SCN) and license values (strings) on a license host, such as either the management server 120 or the authorization server 118. Remote authorization servers, such as authorization server 118, communicate with a license host to share its licenses. The management service also performs certificate management to maintain the certificates used for authentication.

Administrative users of the enterprise network 100, and management server 120 specifically, will use a GUI to control account management, role-based authorization, certificate management, and other administrative tasks. In some embodiments, a web services interface is provided to allow network access to management services. Additionally, the enterprise management features of the present disclosure are configurable to inventory levels of installed software and provide for software updates. This may include updates for endpoints as well as the management service itself.

In addition to the above, an enterprise management configuration server 130 can be included within the enterprise network 100. The enterprise management configuration server 130 generates a user interface at which security policies can be generated, for import into the management server 120 and configuration database 122. Although shown at premises 102b, it is understood that the enterprise management configuration server 130 could be located at a same location as the management server 120, or indeed be implemented on the same physical computing system as the management server 120, in alternative implementations.

In general, although the enterprise network 100 as shown is disclosed as having a plurality of premises 102a-b and a single management server 120, it is noted that other arrangements may exist in which management servers 120 can be distributed at one or more distributed locations, each of which are configured to communicate with an instance of the configuration database 122. Furthermore, one or more of those management servers 120 can be maintained as a redundant management server that is accessed in the event of failure of a primary management server. Additionally, since the management server 120 can be, in some embodiments, implemented as a process that executes within a computing environment, functionality of the management server can be combined with that of other systems on a single computing system or separated onto different computing systems; in some embodiments, a user interface server, management server, authorization server, license server, and/or other enterprise network security services can be located on separate servers, while in other embodiments two or more of these services can be combined on a single device (e.g., a discrete physical computing device or a virtual computing device installed on a partition of a physical computing device). Accordingly, enterprise management configuration server 130 can be configured to distribute security policy configurations to one or more management servers 120, or different security policies (or portions of a common security policy, as discussed further below) to different management servers.

Figure 2:
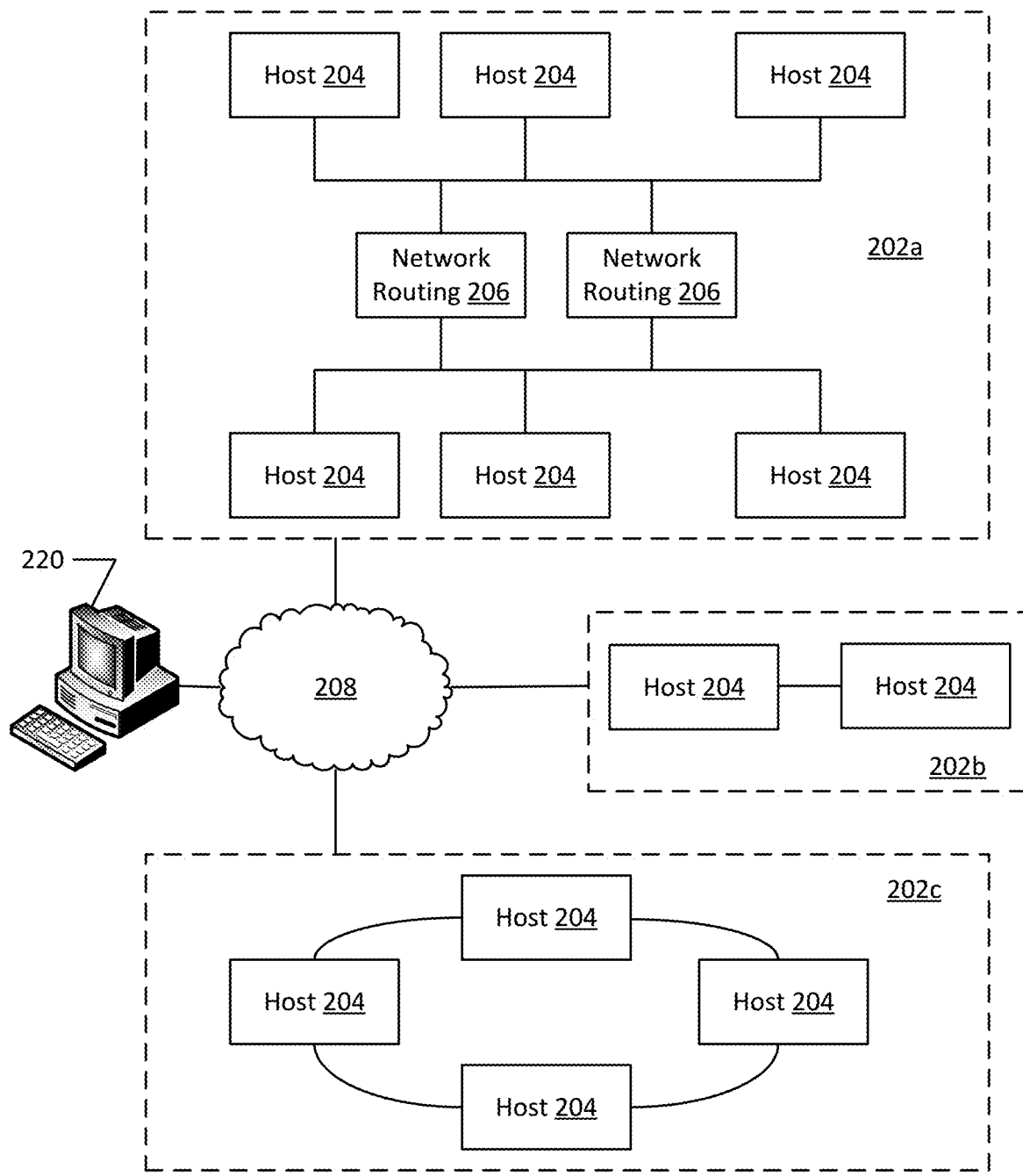
FIG. 2 illustrates a distributed multi-host system in which aspects of the present disclosure can be implemented.
Figure 3:
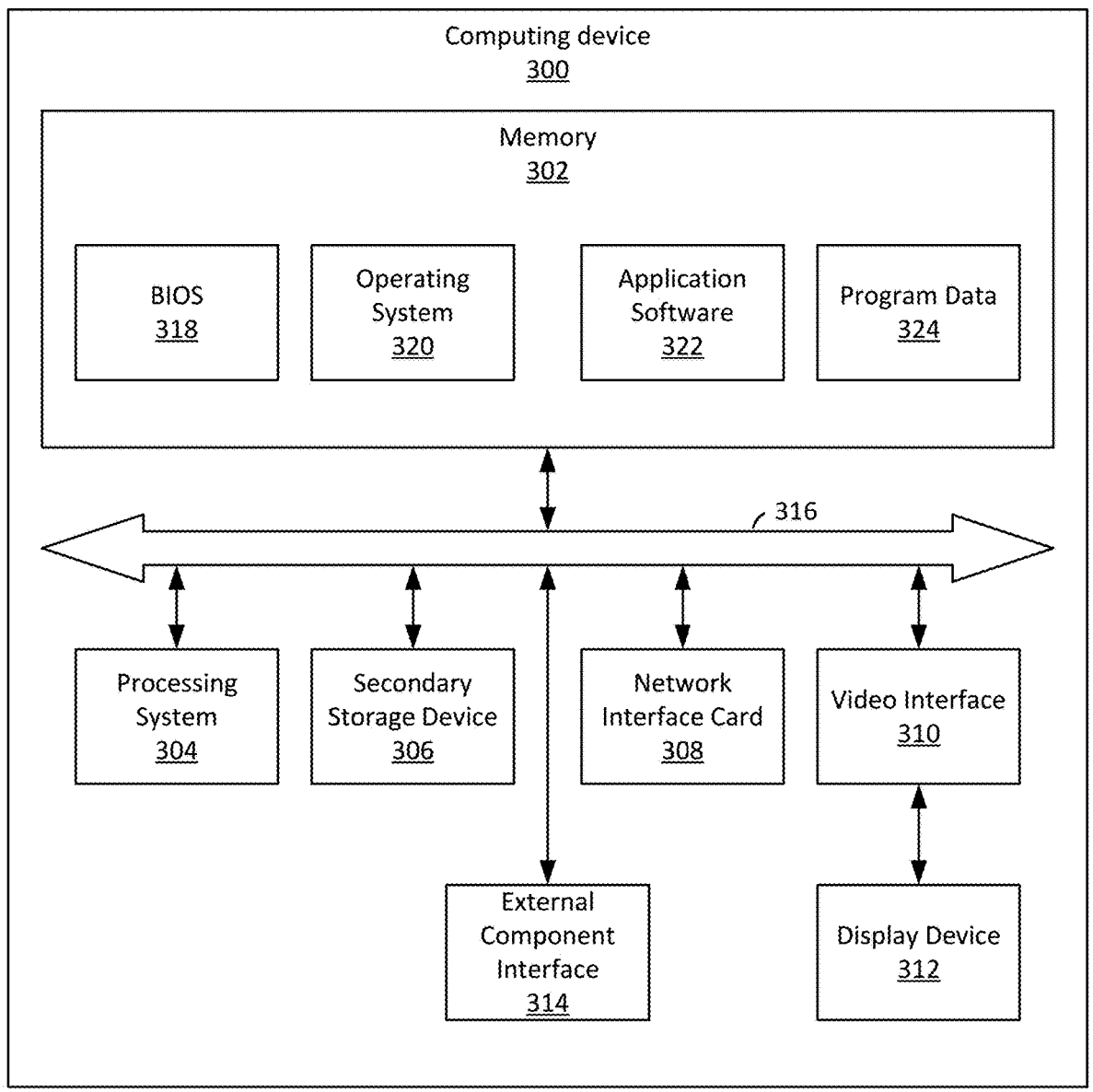
FIG. 3 is a schematic illustration of an example computing system in which aspects of the present disclosure can be implemented.

Referring now to FIG. 2, a distributed multi-host system 200 is shown in which aspects of the present disclosure can be implemented. The system 200 represents a possible arrangement of computing systems or virtual computing systems useable to implement the enterprise network of FIG. 1. In the embodiment shown, the system 200 is distributed across one or more locations 202, shown as locations 202a-c. These can correspond to locations remote from each other, such as a data center owned or controlled by an organization, a third-party managed computing cluster used in a "cloud" computing arrangement, or other local or remote computing resources residing within a trusted grouping. In the embodiment shown, the locations 202a-c each include one or more host systems 204, or nodes. The host systems 204 represent host computing systems, and can take any of a number of forms. For example, the host systems 204 can be server computing systems having one or more processing cores and memory subsystems and are useable for large-scale computing tasks. In one example embodiment, a host system 204 can be as illustrated in FIG. 3.

As illustrated in FIG. 2, a location 202 within the system 200 can be organized in a variety of ways. In the embodiment shown, a first location 202a includes network routing equipment 206, which routes communication traffic among the various hosts 204, for example in a switched network configuration. Second location 202b illustrates a peer-to-peer arrangement of host systems. Third location 202c illustrates a ring arrangement in which messages and/or data can be passed among the host computing systems themselves, which provide the routing of messages. Other types of networked arrangements could be used as well.

In various embodiments, at each location 202, the host systems 204 are interconnected by a high-speed, high-bandwidth interconnect, thereby minimizing latency due to data transfers between host systems. In an example embodiment, the interconnect can be provided by an IP-based network; in alternative embodiments, other types of interconnect technologies, such as an Infiniband switched fabric communications link, Fibre Channel, PCI Express, Serial ATA, or other interconnect could be used as well.

Among the locations 202a-c, a variety of communication technologies can also be used to provide communicative connections of host systems 204 at different locations. For example, a packet-switched networking arrangement, such as via the Internet 208, could be used. Preferably, the interconnections among locations 202a-c are provided on a high-bandwidth connection, such as a fiber optic communication connection.

In the embodiment shown, the various host system 204 at locations 202a-c can be accessed by a client computing system 210 such as the endpoints 106 of FIG. 1. The client computing system can be any of a variety of desktop or mobile computing systems, such as a desktop, laptop, tablet, smartphone, or other type of user computing system. In alternative embodiments, the client computing system 210 can correspond to a server not forming a cooperative part of the para-virtualization system described herein, but rather which accesses data hosted on such a system. It is of course noted that various virtualized partitions within a para-virtualization system could also host applications accessible to a user and correspond to client systems as well.

It is noted that, in various embodiments, different arrangements of host systems 404 within the overall system 200 can be used; for example, different host systems 404 may have different numbers or types of processing cores, and different capacity and type of memory and/or caching subsystems could be implemented in different ones of the host system 404. Furthermore, one or more different types of communicative interconnect technologies might be used in the different locations 202a-c, or within a particular location.

Referring now to FIG. 3, a schematic illustration of an example discrete computing system in which aspects of the present disclosure can be implemented. The computing device 300 can represent, for example, a native computing system within which one or more of servers 116-120, 130 can be implemented, or an implementation of an endpoint 106, or mobile device 110 (a.k.a., nodes). In particular, the computing device 300 represents the physical construct of an example computing system at which an endpoint or server could be established. In some embodiments, the computing device 300 implements virtualized or hosted systems, and executes one particular instruction set architecture while being used to execute non-native software and/or translate non-native code streams in an adaptive manner, for execution in accordance with the methods and systems described herein.

In the example of FIG. 3, the computing device 300 includes a memory 302, a processing system 304, a secondary storage device 306, a network interface card 308, a video interface 310, a display unit 312, an external component interface 314, and a communication medium 316. The memory 302 includes one or more computer storage media capable of storing data and/or instructions. In different embodiments, the memory 302 is implemented in different ways. For example, the memory 302 can be implemented using various types of computer storage media.

The processing system 304 includes one or more processing units. A processing unit is a physical device or article of manufacture comprising one or more integrated circuits that selectively execute software instructions. In various embodiments, the processing system 304 is implemented in various ways. For example, the processing system 304 can be implemented as one or more physical or logical processing cores. In another example, the processing system 304 can include one or more separate microprocessors. In yet another example embodiment, the processing system 304 can include an application-specific integrated circuit (ASIC) that provides specific functionality. In yet another example, the processing system 304 provides specific functionality by using an ASIC and by executing computer-executable instructions.

The secondary storage device 306 includes one or more computer storage media. The secondary storage device 306 stores data and software instructions not directly accessible by the processing system 304. In other words, the processing system 304 performs an I/O operation to retrieve data and/or software instructions from the secondary storage device 306. In various embodiments, the secondary storage device 306 includes various types of computer storage media. For example, the secondary storage device 306 can include one or more magnetic disks, magnetic tape drives, optical discs, solid state memory devices, and/or other types of computer storage media.

The network interface card 308 enables the computing device 300 to send data to and receive data from a communication network. In different embodiments, the network interface card 308 is implemented in different ways. For example, the network interface card 308 can be implemented as an Ethernet interface, a token-ring network interface, a fiber optic network interface, a wireless network interface (e.g., WiFi, WiMax, etc.), or another type of network interface.

The video interface 310 enables the computing device 300 to output video information to the display unit 312. The display unit 312 can be various types of devices for displaying video information, such as an LCD display panel, a plasma screen display panel, a touch-sensitive display panel, an LED screen, a cathode-ray tube display, or a projector. The video interface 310 can communicate with the display unit 312 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 314 enables the computing device 300 to communicate with external devices. For example, the external component interface 314 can be a USB interface, a FireWire interface, a serial port interface, a parallel port interface, a PS/2 interface, and/or another type of interface that enables the computing device 300 to communicate with external devices. In various embodiments, the external component interface 314 enables the computing device 300 to communicate with various external components, such as external storage devices, input devices, speakers, modems, media player docks, other computing devices, scanners, digital cameras, and fingerprint readers.

The communication medium 316 facilitates communication among the hardware components of the computing device 300. In the example of FIG. 3, the communications medium 316 facilitates communication among the memory 302, the processing system. 304, the secondary storage device 306, the network interface card 308, the video interface 310, and the external component interface 314. The communications medium 316 can be implemented in various ways. For example, the communications medium 316 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 302 stores various types of data and/or software instructions. For instance, in the example of FIG. 3, the memory 302 stores a Basic Input/Output System (BIOS) 318 and an operating system 320. The BIOS 318 includes a set of computer-executable instructions that, when executed by the processing system 304, cause the computing device 300 to boot up. The operating system 320 includes a set of computer-executable instructions that, when executed by the processing system 304, cause the computing device 300 to provide an operating system that coordinates the activities and sharing of resources of the computing device 300. Furthermore, the memory 302 stores application software 322. The application software 322 includes computer-executable instructions, that when executed by the processing system 304, cause the computing device 300 to provide one or more applications. The memory 302 also stores program data 324. The program data 324 is data used by programs that execute on the computing device 300. Example program data and application software is described below in connection with FIGS. 4-5.

Although particular features are discussed herein as included within a computing device 300, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. Computer storage media does not include a carrier wave or other propagated or modulated data signal. In some embodiments, the computer storage media includes at least some tangible features; in many embodiments, the computer storage media includes entirely non-transitory components.

It is noted that, although in the embodiments of FIG. 3 shown the computing device 300 represents a physical computing system, the various endpoints and servers of the present disclosure need not be directly implemented on a hardware-compatible system. Rather, such endpoints or servers could be implemented within a virtual computing system or virtual partition of a computing system. In some embodiments, the endpoints and/or servers of the present disclosure are implemented in a partitioned, multiprocessor environment, with the various partitions in which endpoints and/or servers reside being managed by a system virtualization software package. One such system virtualization package is the Unisys Secure Partitioning (SPar) partitioning and virtualization system provided by Unisys Corporation of Blue Bell, Pa.

In general the endpoints of the present disclosure can be configured various ways, with registry settings selected to configure the endpoint to communicate according to an appropriate communication protocol. In some example embodiments, each IPv6-based system includes a capability to communicate with the authorization server via either IPv4 or IPv6 communications. Other administrator-selected IP-based protocols could be used as well.

Figure 4:
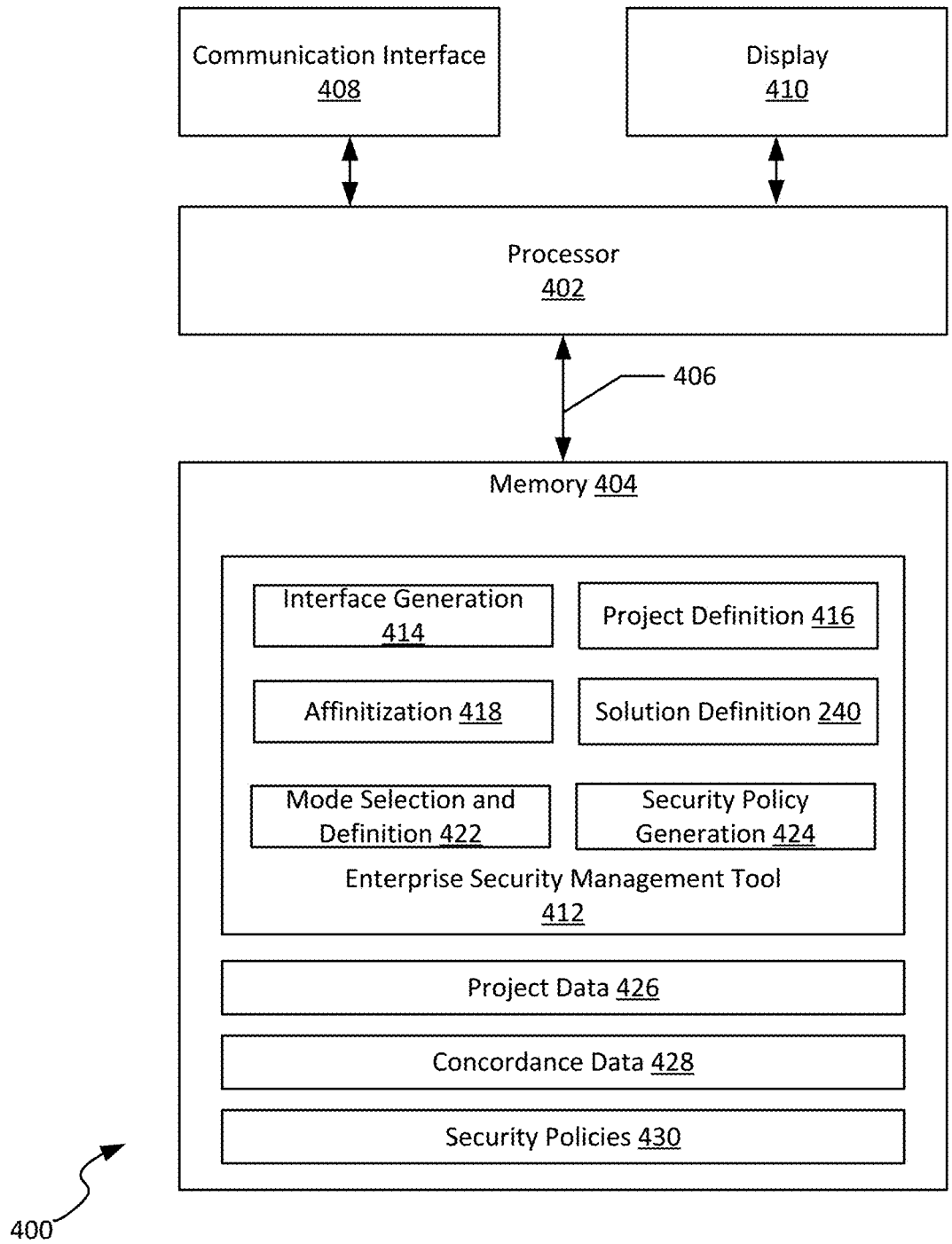
FIG. 4 is a schematic illustration of an example computing system useable within the enterprise network as an enterprise security management configuration server.

FIG. 4 is a schematic illustration of an example computing system useable within the enterprise network as an enterprise security management configuration server, such as the enterprise management configuration server 130 of FIG. 1.

In general, the computing system 400 includes a processor 402 communicatively connected to a memory 404 via a data bus 406. The processor 402 can be any of a variety of types of programmable circuits capable of executing computer-readable instructions to perform various tasks, such as mathematical and communication tasks, such as those described above in connection with FIG. 3. The memory 404 can include any of a variety of memory devices, such as using various types of computer-readable or computer storage media, as also discussed above. In the embodiment shown, the memory 404 stores a query formulation application 412, discussed in farther detail below. The computing system 400 can also include a communication interface 408 configured to receive and transmit data, for example to access data in an external database, such as database 122 of FIG. 1, or to serve a web interface useable to configure security settings within an enterprise, as discussed herein. Additionally, a display 410 can be used for viewing a local version of a user interface, as described herein, via an enterprise security management tool 412.

In various embodiments, the enterprise security management tool 412 generally is configured to generate a configuration user interface accessible by a security administrator of an enterprise to simplify creation and deployment of security policies across the enterprise. In the example embodiment shown, the enterprise security management tool 412 includes an interface generation component 414, a project definition component 416, an affinitization component 418, a solution definition component 420, a mode selection and definition component 422, and a security policy generation component 424. As further outlined below, the memory 404 can include project data 426, concordance data 428, and security policies 430.

In example embodiments, the interface generation component 414 can be configured to generate and serve a configuration user interface, such as is explained below in connection with FIGS. 6-34. The configuration user interface presents to a security administrator a simplified topology of an enterprise network, and allows for grouping of nodes (e.g., servers and endpoints) that are commonly secured using similar security policy settings, and allows for automatic grouping and default security settings to simplify security policy deployment. A project definition component 416 is configured to manage a project, which refers to a container for saved work associated with security configuration settings.

An affinitization component 418 is configured to determine an extent of similarity among nodes in an enterprise network, and in some embodiments group those nodes into "profiles" or collections of similar-acting nodes. For example, a profile may contain a set of application servers that serve a common application, or redundant database servers, or web servers, or even user endpoints having common communication patterns. Although the servers or nodes grouped into a profile may operate somewhat differently, in some embodiments (discussed in further detail below) the affinitization component can determine a level of similarity between nodes and group those nodes that have a similarity above a specified "affinitization threshold". That threshold may be set using a simple user interface feature, as further discussed below. Furthermore, affinitization can be set automatically using such a threshold, or can be set manually by grouping a set of nodes within a profile "container" that can be created using the configuration user interface. As further discussed below, the grouped nodes within the profile can be treated similar to one another, by assigning a set of common security settings (e.g., common filter lists, security enablement/disablement, communities of interest, etc.).

A solution definition component 420 is configured to define one or more solutions in the configuration user interface. Each solution can be made up of two or more profiles (and likely a channel, indicating some communicative relationship between those profiles). While affinitized nodes in a profile will typically have common security settings because of common usage, profiles within a solution may have the same or only similar security settings based on the common data shared among those profiles, or that the profiles cooperate to serve end-users in a particular manner. In various embodiments, the solution definition component 420 can include an automated solution definition option in which the enterprise security management configuration tool identifies root and chained profiles that should be included in a solution or solutions in the enterprise network. In still further embodiments, the solution definition component 420 can also, or in the alternative, include a manual solution definition option in which the enterprise security management configuration tool allows a user to define a root profile and one or more chained profiles as part of a solution. Examples of automatically generated and manually generated solutions are described in further detail below.

A mode selection and definition component 422 is configured to allow a user to select from among a plurality of different modes in which the enterprise security management configuration tool can be used. For example, in a modeling mode (a default mode of the tool), a graphical user interface can be used to define security settings for export. However, a user may be presented with an option to switch to a simulation mode and/or a monitoring mode. In a simulation mode or monitoring mode, various tests can be run to verify consistency of security within the enterprise network, and alerts can be generated and graphically presented to a user to indicate areas of an enterprise network that are not secured, or for which unsecured traffic might be allowed to access data that is intended to be secured (either in a realtime or simulated situation, depending on the mode). Examples of such modes are described in further detail in connection with FIGS. 32-33, below.

A security policy generation component 424 is configured to generate, based on the arrangement and settings defined using the configuration user interface of the enterprise security management configuration tool, an exportable file that can be ingested by the management server 120 of FIG. 1, for population of the configuration database 122 and subsequent dispersion of security policy settings throughout the enterprise network. In example embodiments, the security policy generation component 424 can generate such a file based on all or part of a given project, for example by generating a file that updates security settings for an entire enterprise network, for one or more solutions, or one or more profiles. In specific embodiments, the file is constructed such that it is compliant with an application programming interface (API) exposed by the management server 120 for modifying security settings in the configuration database 122.

In the embodiment shown, the memory 404 can be configured to also store project data 426, concordance data 428, and security policies 430. This information generally represents the input, current state, and output of the enterprise security management configuration tool as to one or more projects managed using that tool. Specifically, concordance data 428 can correspond to information regarding the identity and interactions of various endpoints and servers within an enterprise network. In some examples, a flow consists of a service having a consumer/provider relationship, defining a "friendship" between two nodes. In example embodiments, the concordance data, defining such flows and friendships, can include network logs captured at one or more endpoints, such as is discussed below in connection with FIG. 5. The project data 426 corresponds to a current state of a project, including any profiles (logical groupings of nodes), solutions (logical groupings of profiles), channels (communications detected between/among nodes and/or profiles), and/or any settings associated therewith, for example filter rules, security enablement/disenablement, or other security-based settings capable of being deployed by the management server 120. The security policies 430 correspond to the data output from the enterprise security management configuration tool, for ingestion by the management server 120.

Figure 5:
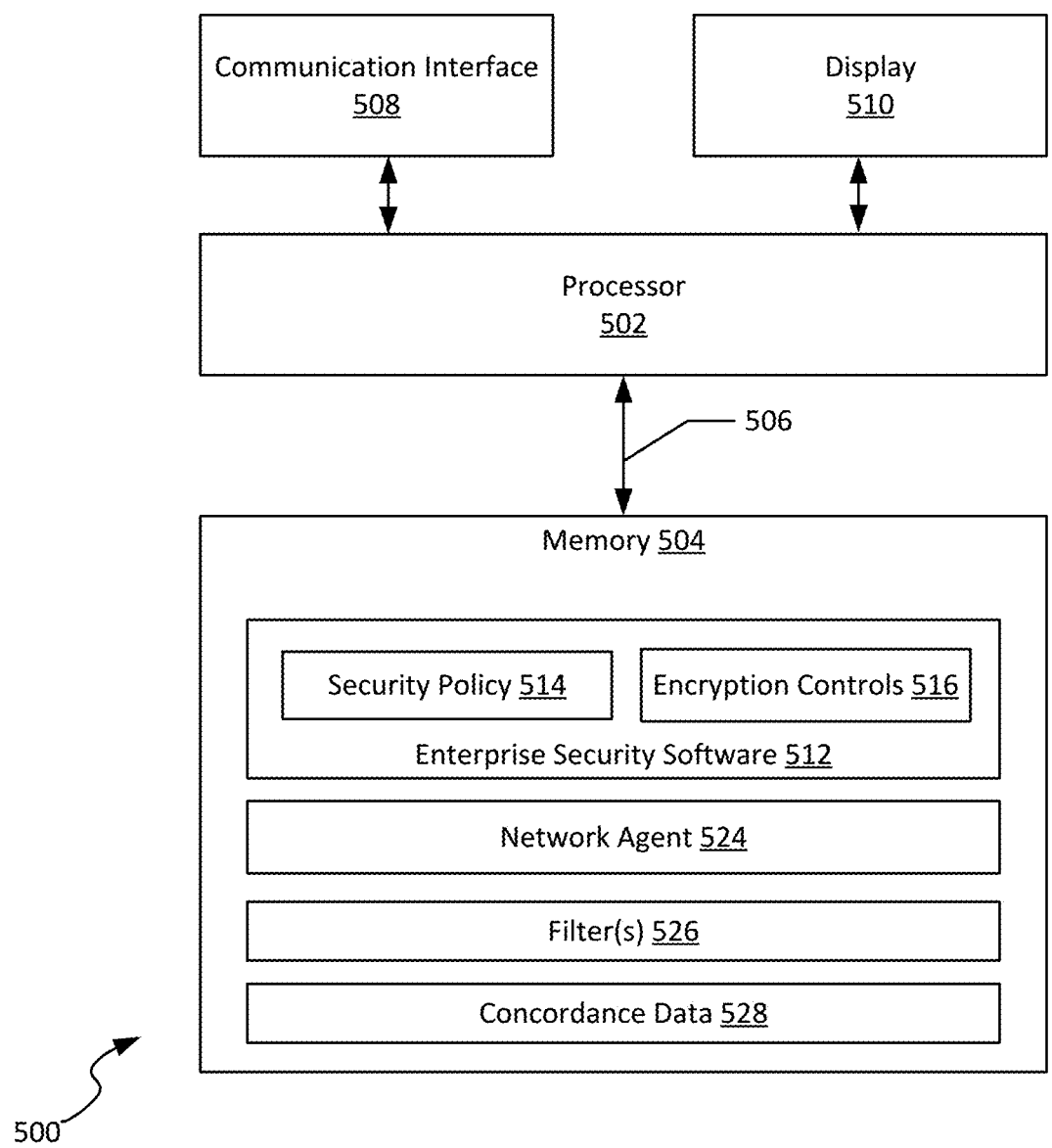
FIG. 5 is a schematic illustration of an example computing system useable within the enterprise network for which a security configuration can be deployed.

FIG. 5 is a schematic illustration of an example computing system 500 useable within the enterprise network for which a security configuration can be deployed. In general, the computing system 500 includes a processor 502 communicatively connected to a memory 504 via a data bus 506. The processor 502 can be any of a variety of types of programmable circuits capable of executing computer-readable instructions to perform various tasks, such as mathematical and communication tasks, such as those described above in connection with FIG. 3. The memory 504 can include any of a variety of memory devices, such as using various types of computer-readable or computer storage media, as also discussed above. In the embodiment shown, the memory 504 stores enterprise security software 512 and a network agent 524. The computing system 400 can also include a communication interface 508 configured to receive and transmit data, for example to interact with other nodes within or external to an enterprise network. Additionally, a display 410 can be included for user interaction.

The enterprise security software 512 is configured to control security in storage of data at and communication of data at the computing system 500, and between that system and remote systems. The enterprise security software includes a security policy 514 and encryption controls 516. The security policy 514 and encryption controls 516 can include settings as defined by an enterprise security management policy set at a management server, such as management server 120, which are received as filters 526. Details regarding deployment and use of such enterprise security software are provided in U.S. patent application Ser. No. 14/688,348, entitled 'Enterprise Management for Secure Network Communications over IPSec", the disclosure of which was previously incorporated by reference, as well as U.S. patent application Ser. No. 14/753,120, entitled "Secured Networks and Endpoints Applying Internet Protocol Security", and U.S. patent application Ser. No. 14/753,146, entitled "Secure Network Communications in a Mobile Device over IPsec", each assigned to Unisys Corporation of Blue Bell, Pa., the disclosures of each of which are hereby incorporated by reference in their entireties.

The network agent 524 is, in the embodiment shown, a network traffic monitor installed at the computing system 500 and configured to collect concordance data 528. In an example implementation, the concordance data 528 can correspond to network traffic data seen at the computing system 500, and can be uploaded to an enterprise security management configuration server for use as concordance data to determine, along with concordance data from other computing systems (nodes) within the enterprise network, affinities and communication channels among those nodes. In example embodiments, the network traffic can be captured in the form of a PCAP file containing network traffic at the computing system 500.

Figure 6:
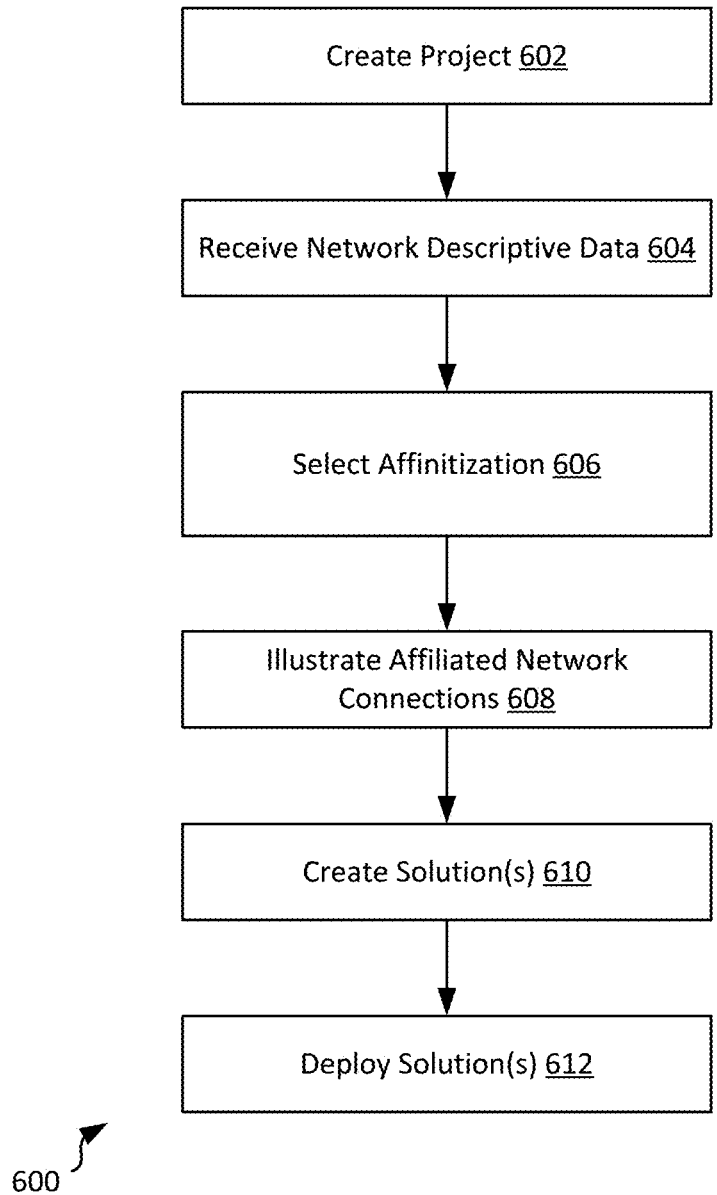
FIG. 6 is a flowchart of a method for configuring security management settings within an enterprise network, according to an example embodiment of the present disclosure.

Now referring specifically to FIGS. 6-12, details regarding use of an enterprise security management configuration server to configure an enterprise network are provided. FIG. 6 is a flowchart of a method 600 for configuring security management settings within an enterprise network, according to an example embodiment of the present disclosure. The method 600 can be performed, for example, at an enterprise security management configuration server, such as server 130 of FIG. 1.

In the example shown, the method 600 includes creating a project in an enterprise security management configuration tool (step 602), and importing network concordance data into the tool (step 604). The network concordance data can be received from nodes within an enterprise network, such as the computing system 500 described above in connection with FIG. 5. The network concordance data can be aggregated, for example by the enterprise security management configuration server or a management server, such as management server 120 of FIG. 1.

In some examples, the concordance data can define the nodes and interconnections among the nodes that are included within the enterprise network. Optionally, a configuration user interface can display each of the nodes, and channels among the nodes, in such a configuration user interface, based on the flows and friendships defined in the concordance data. The selection of which nodes within an enterprise network from which to gather concordance data is a matter of choice, but to ensure a complete security solution, it is preferred to capture concordance data from an adequate number of nodes as will provide an accurate model of the enterprise network. For example, such concordance data could be gathered from each node intended to be secured.

In the example shown, the method 600 includes receiving a selection of an affinitization level to be used in grouping nodes into profiles (step 606). This can include presenting an affinitization tool to a user in a configuration user interface as part of a tool palette included therein, and receiving a selection of a specific setting for affinitization that defines a threshold similarity between concordance data of nodes before those nodes will be grouped into profiles. One example tool is discussed in further detail below in connection with FIG. 14.

Upon selection of the affinitization level, the method 600 can include processing affinitization based on the concordance data, and updating a user interface to illustrate affiliated network connections in the form of profiles (step 608). One example of such an updated user interface including nodes grouped into profiles based on affinitization is discussed in further detail below in connection with FIGS. 14-15.

In the example shown, the method 600 also includes creating one or more solutions by grouping two or more profiles that are connected by a channel (step 610). As noted above, a solution generally corresponds to a logical grouping of one or more profiles, typically two or more profiles that are interconnected by a channel and which are likely to have common security settings based on the manner in which the profiles interact. For example, a database server, an application server communicatively connected to the database server, one or more web servers hosting web-based user interfaces for the application, and one or more load balancers distributing traffic within the group of application servers included within the profile of application servers, or other types of network devices likely to be required to share security policy settings due to shared data/network traffic. In example embodiments, creating one or more solutions can be performed automatically based on a methodology for automatically identifying a root profile (a likely starting point or source of data that may be delivered by way of a solution) and subsequently identifying one or more chained profiles, other than endpoints, that are logically connected. In alternative embodiments, creating solutions can be performed manually by manually identifying a root profile to be included in a solution, and dragging and dropping one or more other profiles interconnected to the root profile by a channel connected to the root profile into association with the solution within the configuration user interface.

In the example shown, the method 600 includes deploying one or more solutions to an enterprise management server (step 612). In example embodiments, deploying solutions includes deploying an entire project to an enterprise management server, such as management server 120. This can include generating a policy file that can be ingested by the management server 120, for storage of security settings in the configuration database 122. In other embodiments, deploying solutions includes receiving a selection of one or more solutions and generating a policy file directed only to portions of an enterprise network. Such a partial project deployment can be transmitted as one or more policy files distributed to one or more different management servers 120. The policy file, or security settings file, can be configured to describe security settings for operation and interactivity of each of the one or more nodes included in the identified one or more solutions, and is distributed to the configuration database 122 of associated management servers for distribution to such nodes.

Figure 7:
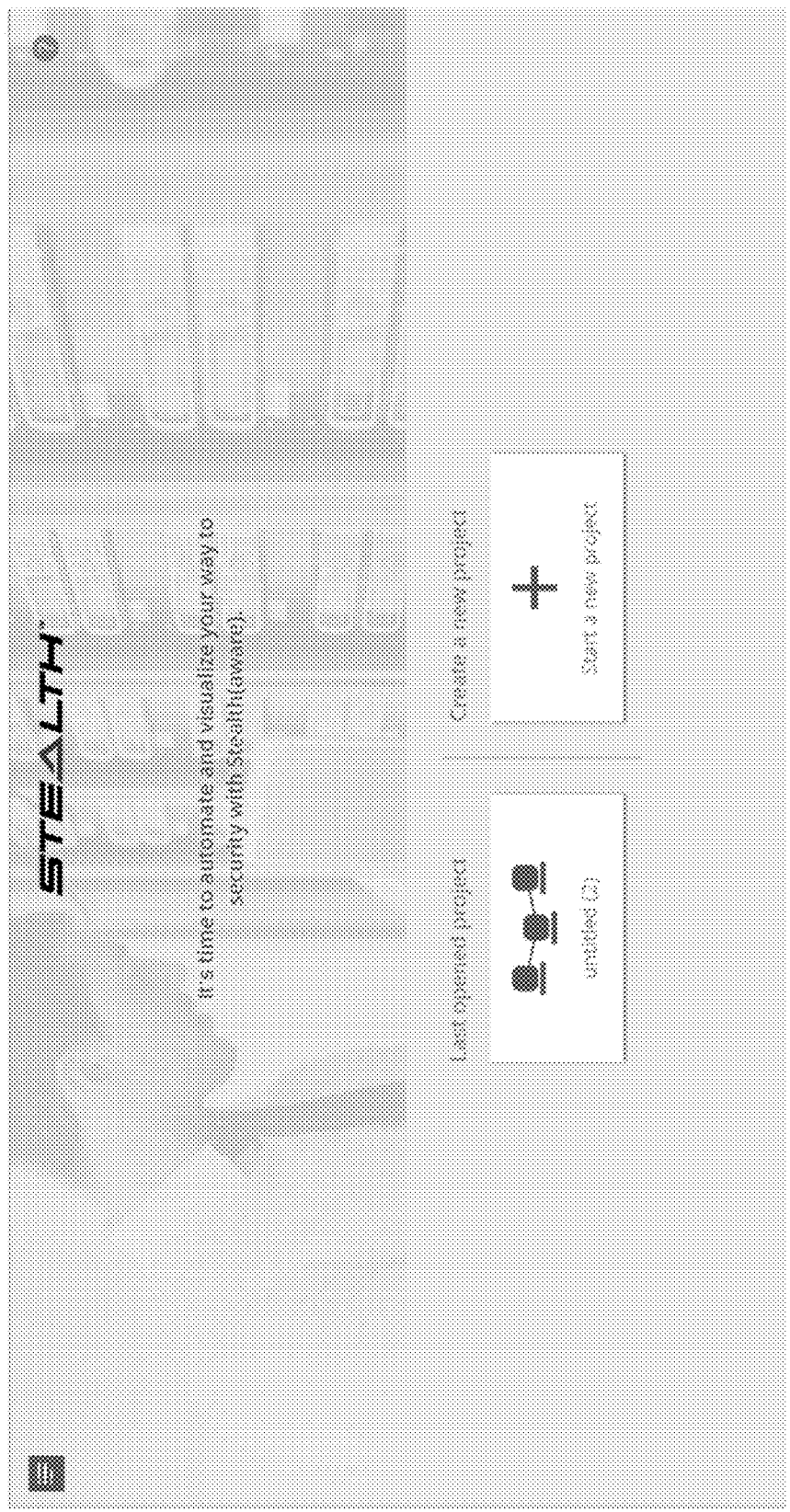
FIG. 7 is a configuration user interface of an enterprise security management configuration tool useable to create an enterprise security configuration project, according to an example embodiment.

Referring to FIGS. 7-12, specific implementation details regarding enterprise security management tool are illustrated. In particular, a set of screens generated as part of a configuration user interface are shown, illustrating operation of the enterprise security management tool. As an initial matter, FIG. 7 illustrates a configuration user interface 700 of an enterprise security management configuration tool useable to create an enterprise security configuration project, according to an example embodiment. The configuration user interface 700 allows a user to select an existing project or a new project for use of the enterprise security management tool. As noted above, a project corresponds to a container in which a security configuration can be developed for export to a management server 120.

Figure 8:
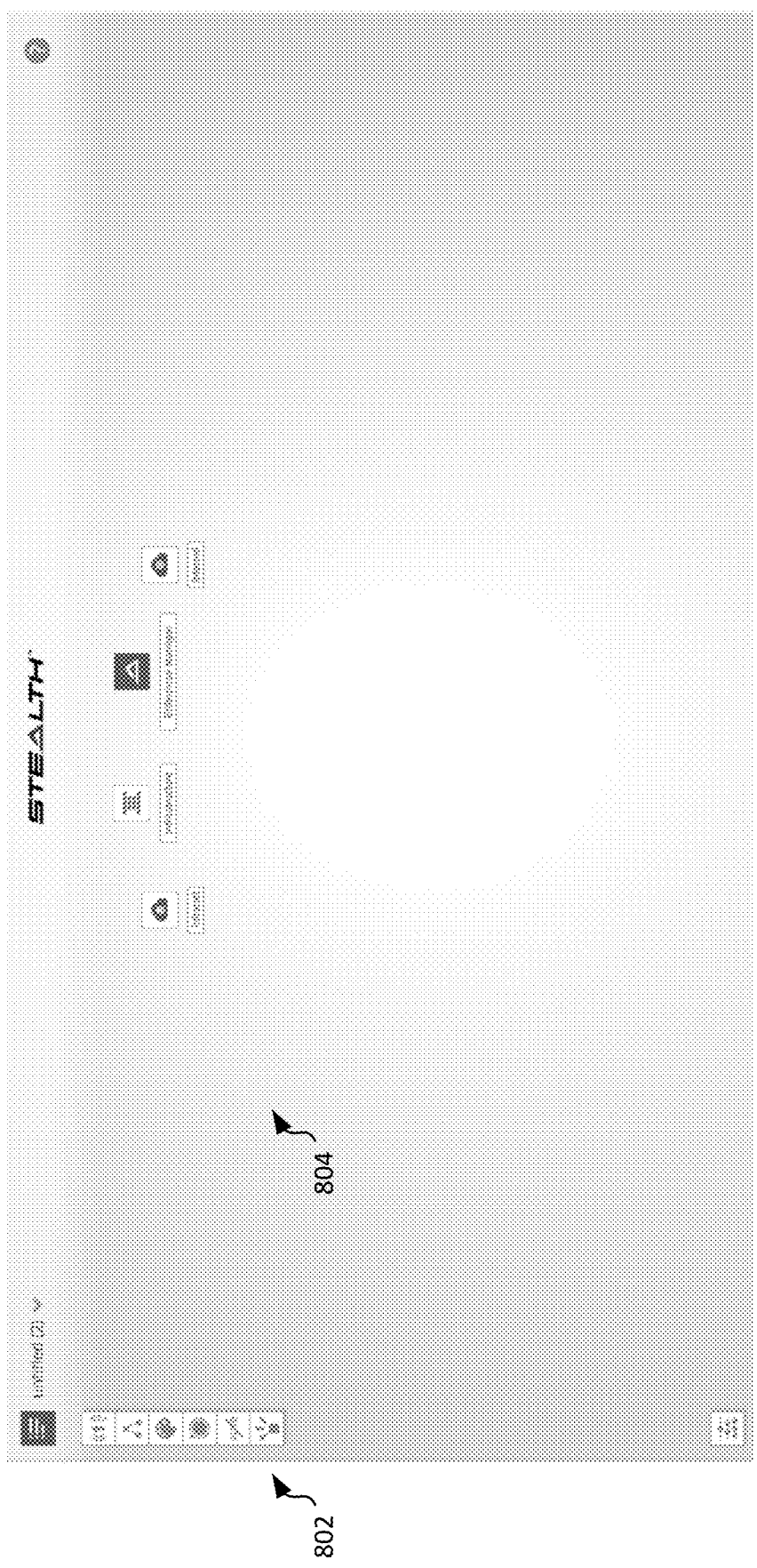
FIG. 8 is a general configuration user interface of an enterprise security management configuration tool, according to an example embodiment.

FIG. 8 illustrates a configuration user interface 800 reached after selection of a particular project in which to operate, in general, the configuration user interface 800 includes an enterprise topology region 802 in which an enterprise topology can be viewed and graphically manipulated, and a tool palette 804. In the example implementation shown, the enterprise topology region 802 includes four icons representing predefined solutions. The predefined solutions correspond to an intranet solution, an infrastructure solution, an enterprise manager solution, and an intranet solution. Each of these solutions will generally represent portions of an enterprise network, or systems to which a secured portion of an enterprise network will be required to interact with, in a typical configuration.

Figure 9:
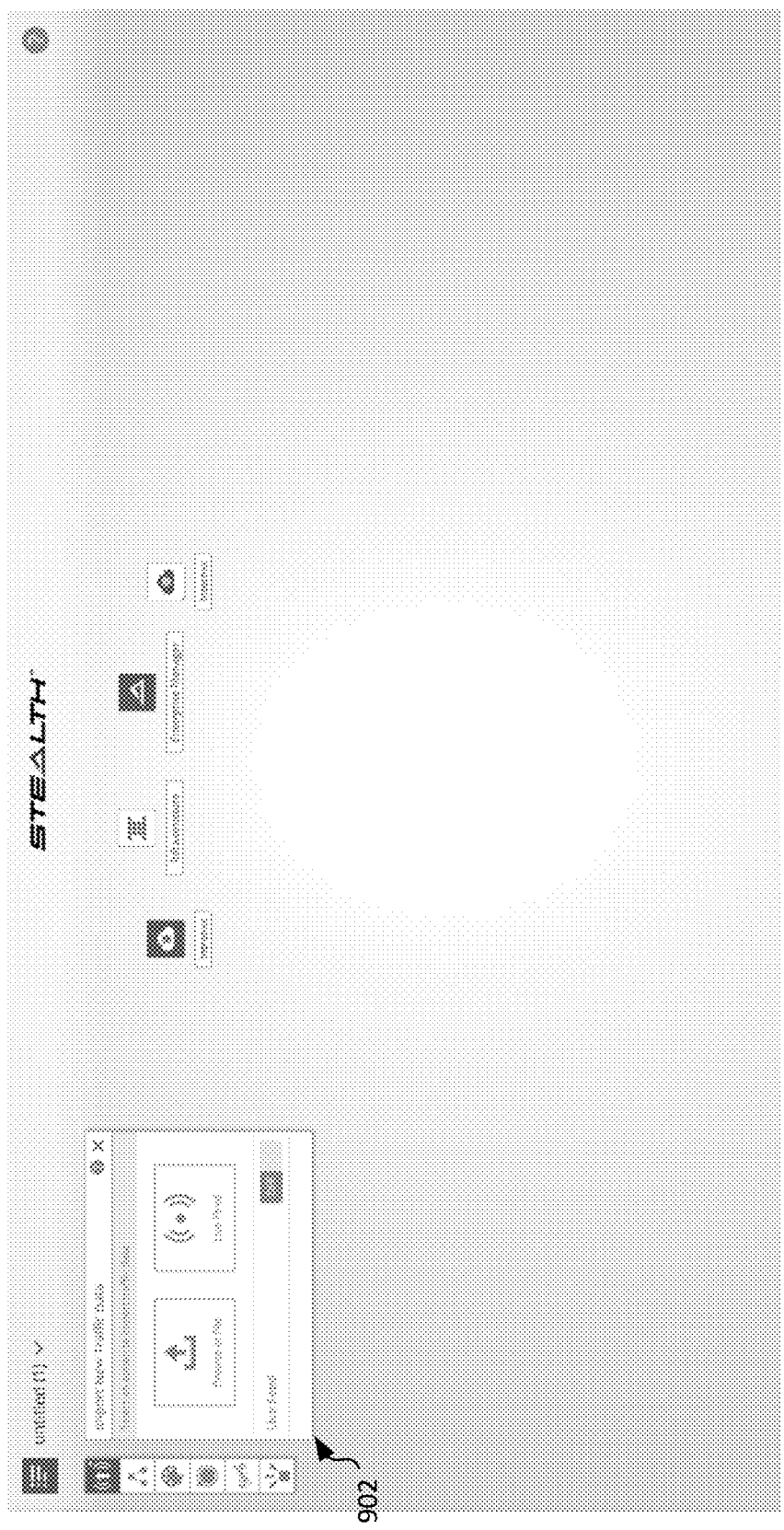
FIG. 9 is a configuration user interface of an enterprise security management configuration tool illustrating importation of concordance data, according to an example embodiment.

FIG. 9 illustrates a further modification of a configuration user interface 900 reached after selection of a traffic import tool from the tool palette 804. The configuration user interface 900 displays a concordance data import region 902, which includes an import tool and a monitoring tool. The import tool is configured to, upon selection, prompt a user to select a file containing concordance data to import into the currently-selected project. The monitoring tool will initiate a listening and/or traffic request command to be issued from the enterprise security management configuration server. Nodes within the enterprise network can then respond with concordance data gathered by one or more agents placed within the network at various nodes, as illustrated in FIG. 5. In either case, the enterprise security management tool receives concordance data, either represented by a snapshot of representative, static network traffic within the enterprise network, or on a realtime basis as received from nodes within the network.

Figure 10:
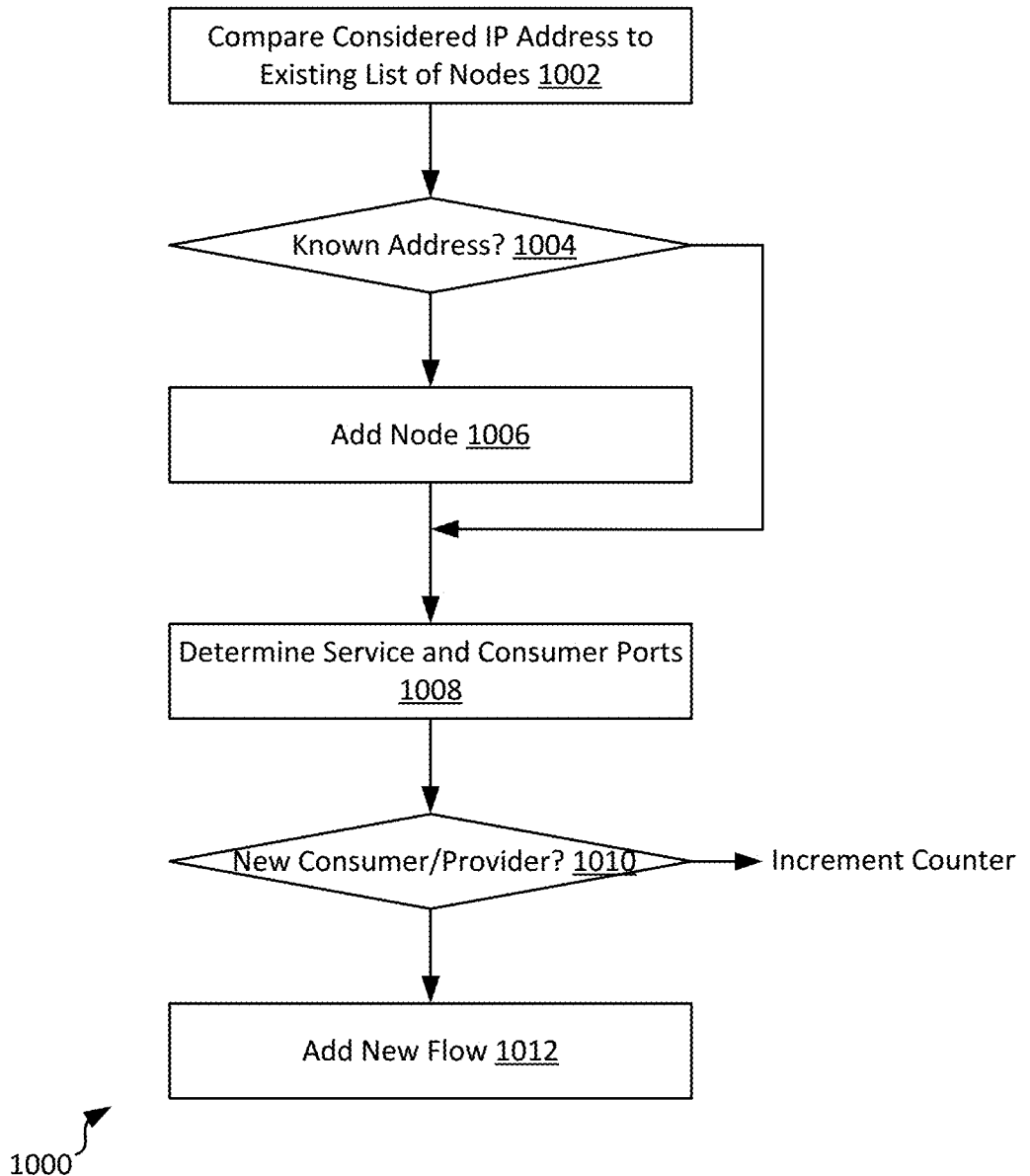
FIG. 10 is example method of processing concordance data to generate a user interface displaying a logical topology of an enterprise network, according to an example embodiment.

FIG. 10 illustrates an example method 1000 of processing concordance data to generate a user interface displaying a logical topology of an enterprise network, according to an example embodiment. In the example embodiment, once the concordance data (traffic data collected from agent(s)), is collected in the enterprise security management configuration tool, each IP address is checked against a list of previously observed addresses in the current project (step 1002). If a new address is encountered (at operation 1004) addresses are added to a list of known nodes (step 1006), A service port and a consumer port are determined based on standards, and the source/destination are identified as a provider (step 1008). In example implementations, if the service port is the source port, the source IP address is determined to be the provider node of that flow. If the service port is the destination port, the destination IP address is the provider node. The other node is determined to be the consumer node.

It is then determined whether the considered packet reflects a same consumer/provider relationship for a particular service (at operation 1010). If so, a counter is incremented; otherwise, a new flow is added to the enterprise topology (step 1012).

Figure 11:
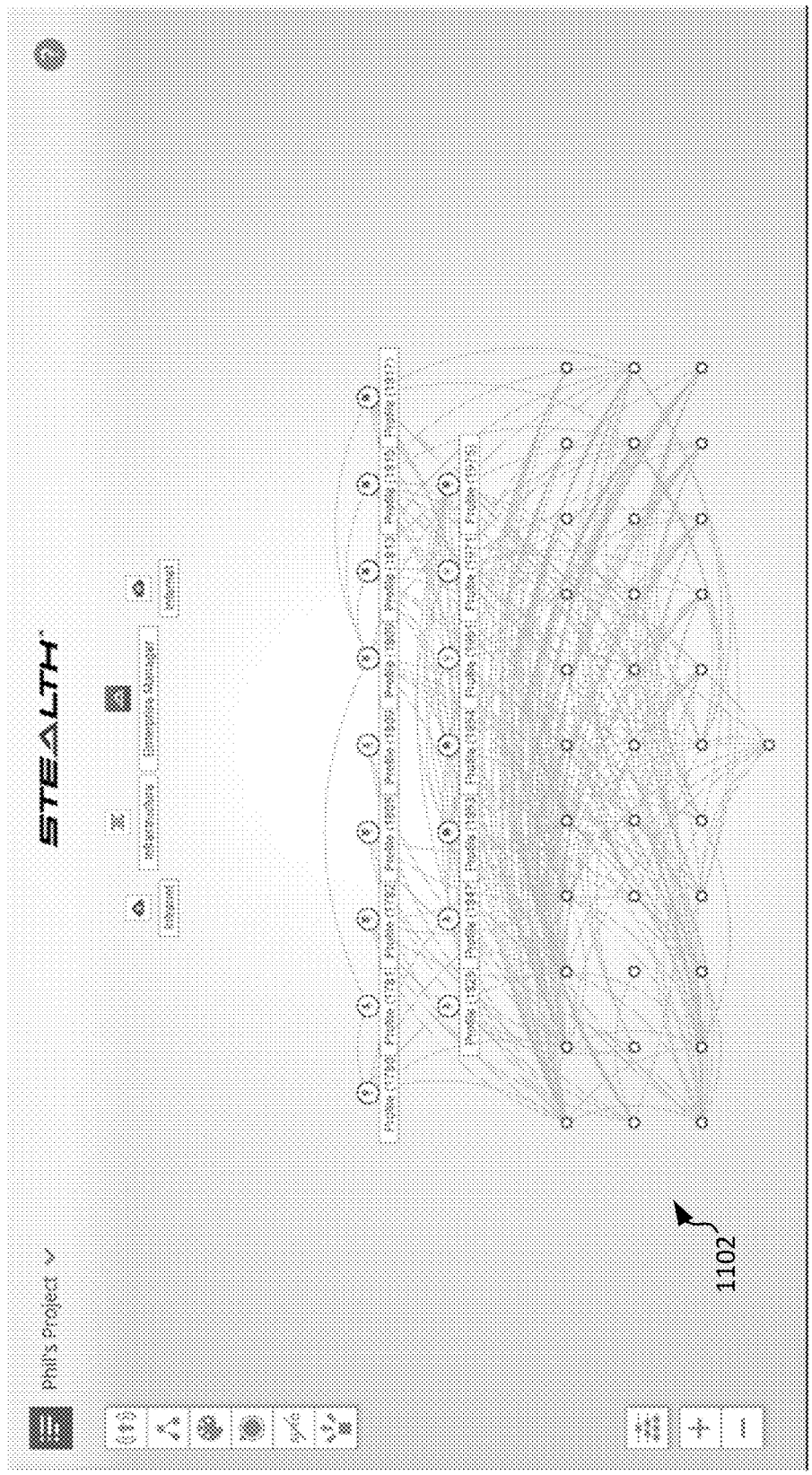
FIG. 11 is a configuration user interface of an enterprise security management configuration tool in which concordance data has been imported, illustrating a plurality of nodes within an enterprise network, according to an example embodiment.

Once the concordance data is processed, a user interface can be generated. FIG. 11 is one example a configuration user interface 1100 of an enterprise security management configuration tool in which concordance data has been imported, illustrating a plurality of nodes within an enterprise network, according to an example embodiment. The configuration user interface 1100 can be generated, for example, by classifying nodes and flows to define logical relationships across an entire enterprise network.

Figure 12:
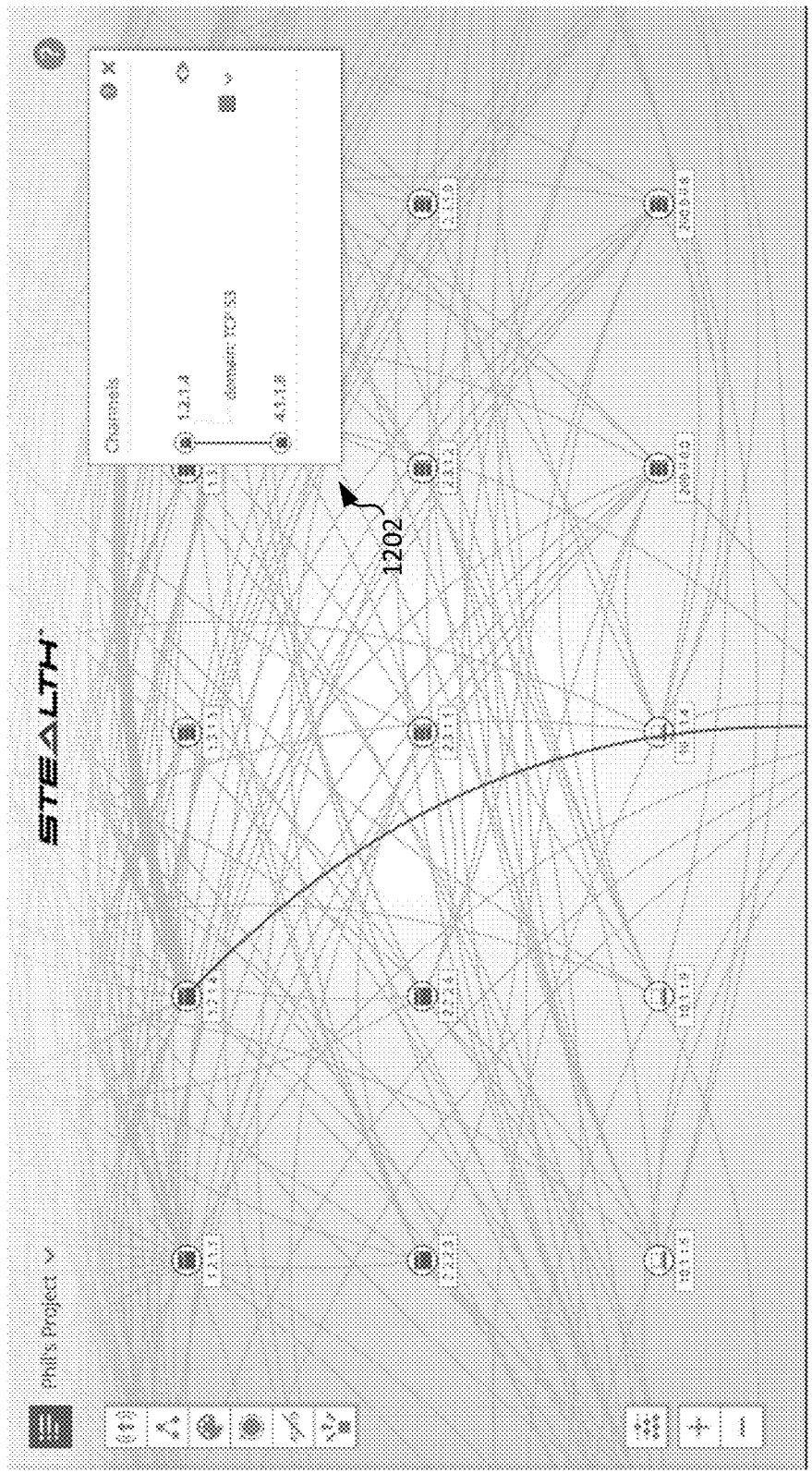
FIG. 12 illustrates the configuration user interface of FIG. 11, showing characteristics of one possible channel between two nodes, according to an example embodiment.

As seen in FIG. 11, within the enterprise topology region 802, an initial topology 1102 is shown. This initial topology displays a plurality of individual nodes, which correspond to individual computing systems within an enterprise network, as well as a plurality of channels, which represent specific communication flows among nodes and with external systems from network data, including a source, destination, port information, security information (if any), and other information captured in network monitoring data logs that might be collected by agents as part of concordance data. As seen in FIG. 12, selection of a channel between two nodes in the configuration user interface 1100 results in display of a configuration user interface 1200 that includes a channel properties region 1202. The channel properties region shows, in the embodiment illustrated, a source and destination IP address of the sending and receiving system, respectively, a domain, and whether the communication channel is secured (in a color-coded icon associated with a selectable drop-down menu within the channel properties region). In example embodiments, a green icon illustrates that the channel is secured (e.g., encrypted) according to the standards defined in the endpoint's policy and/or filters, while a red icon may indicate an unsecured endpoint or communication channel, and a yellow icon may indicate some potential vulnerability, e.g., with respect to possible data accessibility, cleartext permissions in filters, etc.

As can be seen in FIGS. 11-12, mapping each node within an enterprise network according to concordance data leads to a complex diagram in which it can be difficult to readily view logical relationships among nodes, or to identify which nodes should be assigned what security policies. As provided below, by grouping nodes into profiles, and profiles (and nodes) into solutions, groups of nodes can more readily be assigned security policies that are consistent across an enterprise, and deployment of security policies can be performed more quickly and consistently.

II. Affinitization and Profile Generation within Enterprise Security Management Configuration Tool Referring now to FIGS. 13-20, additional details regarding grouping of nodes into profiles, and specific characteristics of profiles are discussed. As noted above, profiles generally each correspond to groups of nodes having similar operation, for example accessing a common resource or being accessed by common endpoints. Endpoints can be grouped into profiles as well, where those endpoints are associated with users having similar security and access rights. By grouping nodes into profiles, commonly-operating nodes can be represented by a single profile icon (rather than by the extensive mapping of resources, as is seen in FIG. 11, above.

Figure 13:
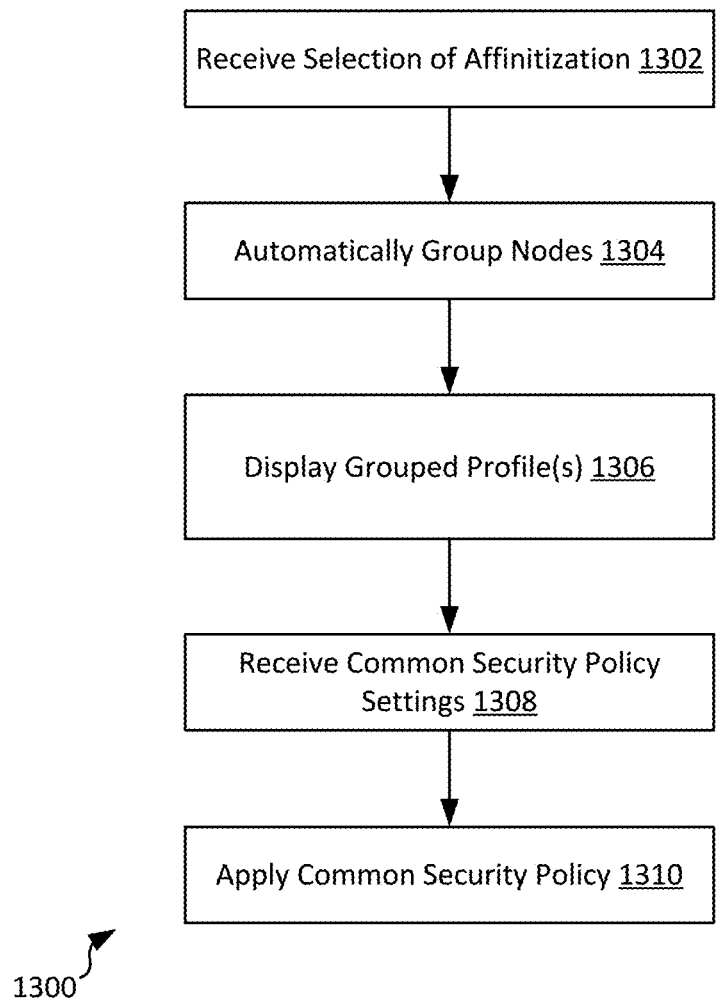
FIG. 13 is a flowchart of a method for logically grouping nodes according to affinity, according to an example embodiment of the present disclosure.

Referring to FIG. 13, a method 1300 for logically grouping nodes according to affinity into profiles is illustrated, according to an example embodiment of the present disclosure. The method 1300 generally illustrates how a profile can be automatically created based, at least in part, on the concordance data imported into a project within the enterprise security management configuration tool.

Figure 14:
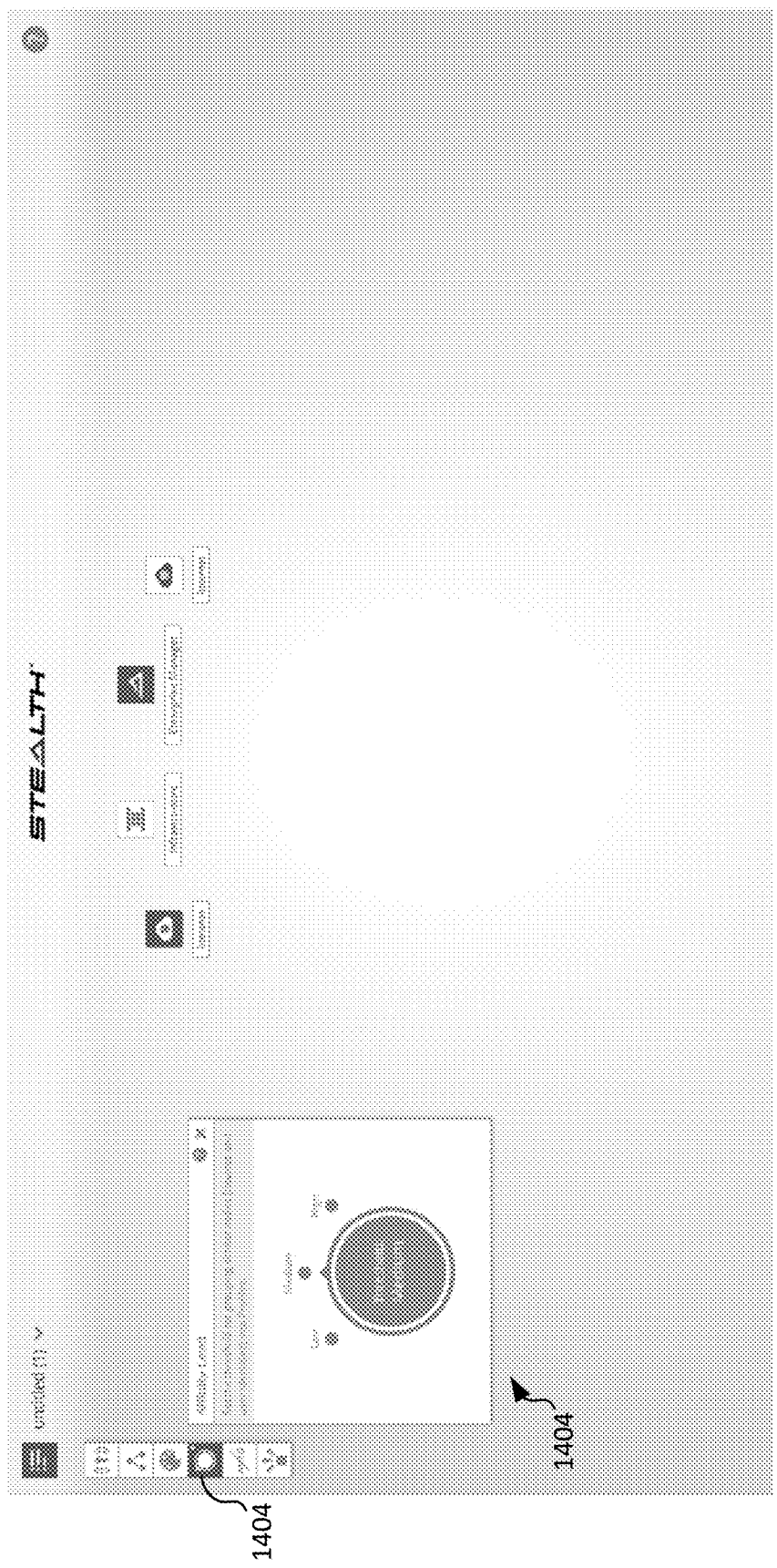
FIG. 14 is a configuration user interface of an enterprise security management configuration tool in which an affinitization tool is depicted, according to an example embodiment.

In the embodiment shown, the method 1300 includes receiving a selection of an affinitization level at which nodes will be grouped into a profile (step 1302). The affinitization level can be manually defined, or can be selected from among a plurality of preset levels. In one example embodiment, the affinitization level can be set using an affinitization knob presented in the configuration user interface in response to selection of an affinitization tool from the tool palette. Such an affinitization knob can have a plurality of settings, such as low, medium, and high settings. In such an example, a low setting may be set at a low predetermined threshold, such as a normalized affinitization of 0.6 (e.g., 60% similar based on a set of node characteristics) for low affinitization, 0.8 for medium affinitization, or 1.0 for high affinitization, indicating that the nodes must be identical to be grouped into a profile. Affinitization can take into account a variety of factors, including, for example, a logical or physical location of the node, communications between the node and other nodes within the enterprise network or external to the enterprise network, domain names or other identifiers of the node, or other types of attributes from which similarity can be derived. One example of an affinitization tool is depicted in FIG. 14, discussed below.

In the embodiment shown, the method 1300 further includes automatically grouping nodes into profiles in response to selection of a predetermined affinity (step 1304). The grouping of nodes into profiles can, in such cases, simplify a depiction of an enterprise network topology, at least because multiple similarly-situated nodes are grouped under a single profile icon (step 1306), and as such, a plurality of grouped nodes can be displayed as a plurality of profiles. Additionally, because the single icon for a profile can represent a plurality of nodes, the single icon can have a number of security settings be applied to each of the nodes, as noted below.

In general, the affinitization between profiles can be performed in a variety of different ways to perform the grouping noted above. For example, for any "unlocked" profile (e.g., a profile not previously modified by a user), the enterprise security management configuration tool can determine, for each unique flow for a node, whether the flow is new for a node-to-node, or profile-to-profile, channel. Affinity scores can be determined, as a value between 0.0 and 1.0, by determining a hit counter for each flow divided by the number of unique flows. The affinity level can then be determined as noted below.

In example embodiments, common security policy settings can be received in the configuration user interface (step 1308) and applied as a common security policy to each of the nodes within the profile (step 1310). This can be done when a particular solution, or project, is exported to a configuration database 122 via management server 120.

Now referring to FIGS. 14-20, various features associated with nodes grouped into profiles by affinitization are illustrated. As an initial matter, and as noted above, FIG. 14 illustrates a configuration user interface 1400 which generally corresponds to that shown in FIG. 8, above, but with an affinitization tool 1402 from the tool palette selected. In the configuration user interface 1400, an affinity level selector region 1404 subsequently appears, and allows a user to "twist" the depicted knob, by way of a click and drag operation (or equivalent drag operation on a touch screen display), to one of the displayed selectable affinitization levels. As illustrated, the affinitization tool includes a knob movable between low, medium, and high affinitization levels.

Figure 15:
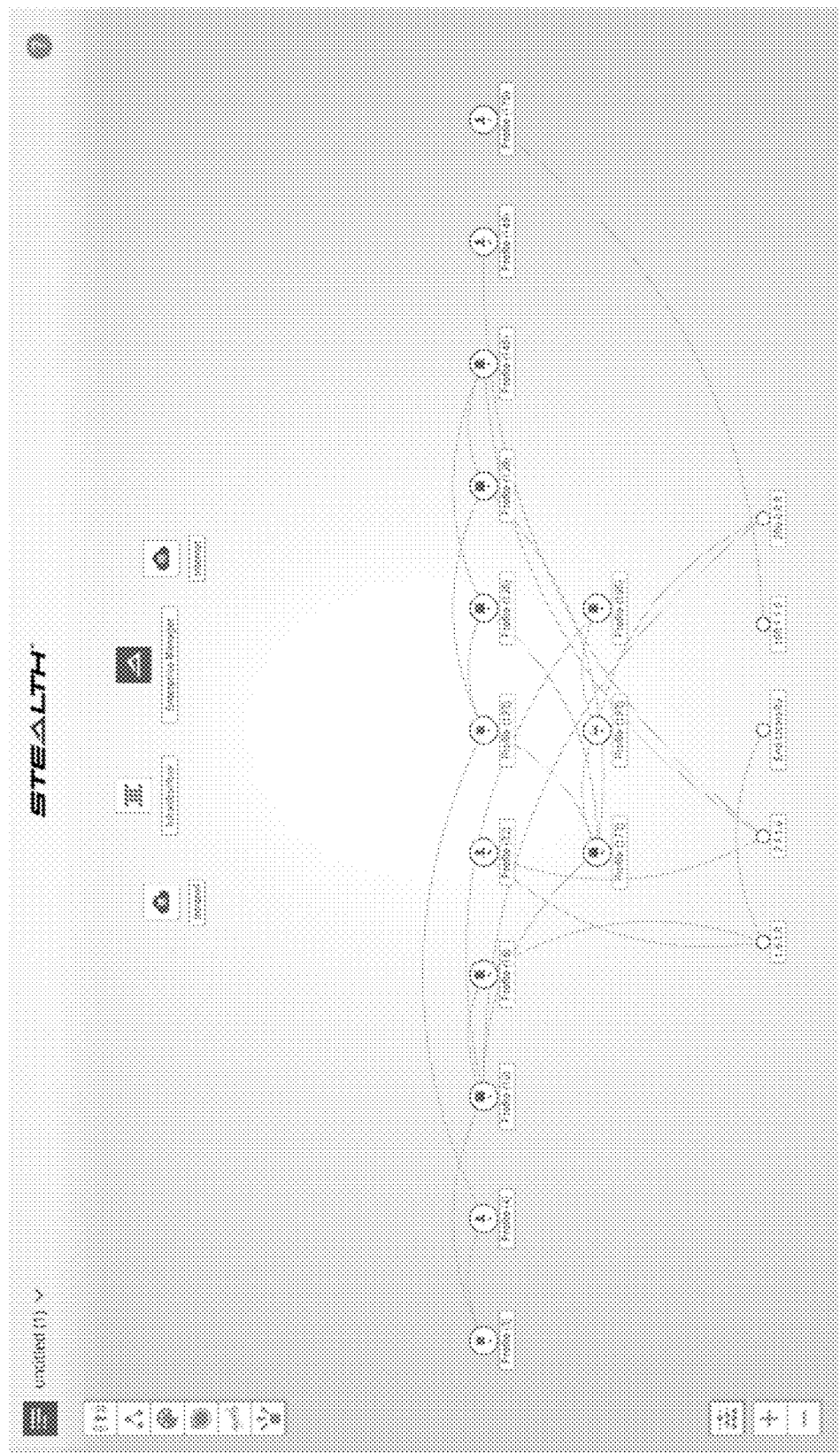
FIG. 15 is a configuration user interface of an enterprise security management configuration tool in which affinitization is applied, as compared to the user interface of FIG. 11, according to an example embodiment.

Referring to FIG. 15, a configuration user interface 1500 is shown after selection of a "medium" affinitization level in the manner illustrated in FIG. 14, but using the logical enterprise topology illustrated in FIG. 11. As seen in the configuration user interface 1500 compared to the user interface 1100 of FIG. 11, far fewer individual icons are depicted because common types of nodes are grouped within a single profile icon. Furthermore, because of the types of concordance data collected regarding operations of each of the nodes, the icons can, in the embodiment shown, differ from each other based on the types of operations performed by the nodes within a profile. In the example shown in FIG. 15, various profiles of database servers, application servers, end users, etc. can be separately depicted graphically within a single icon for each respective profile.

Figure 16:
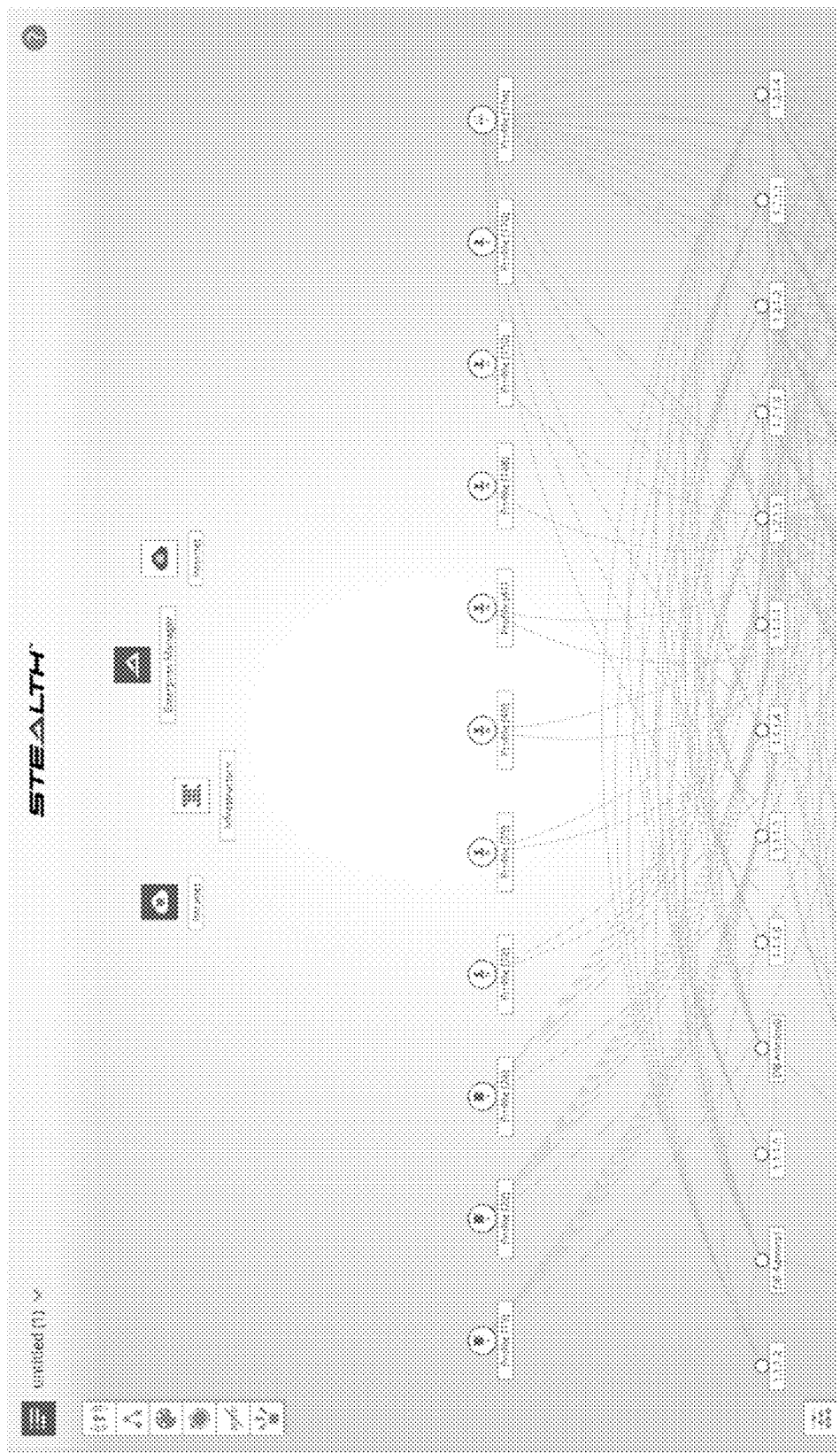
FIG. 16 is a configuration user interface of an enterprise security management configuration tool in which various profiles are grouped by affinitization, according to an example embodiment.
Figure 17:
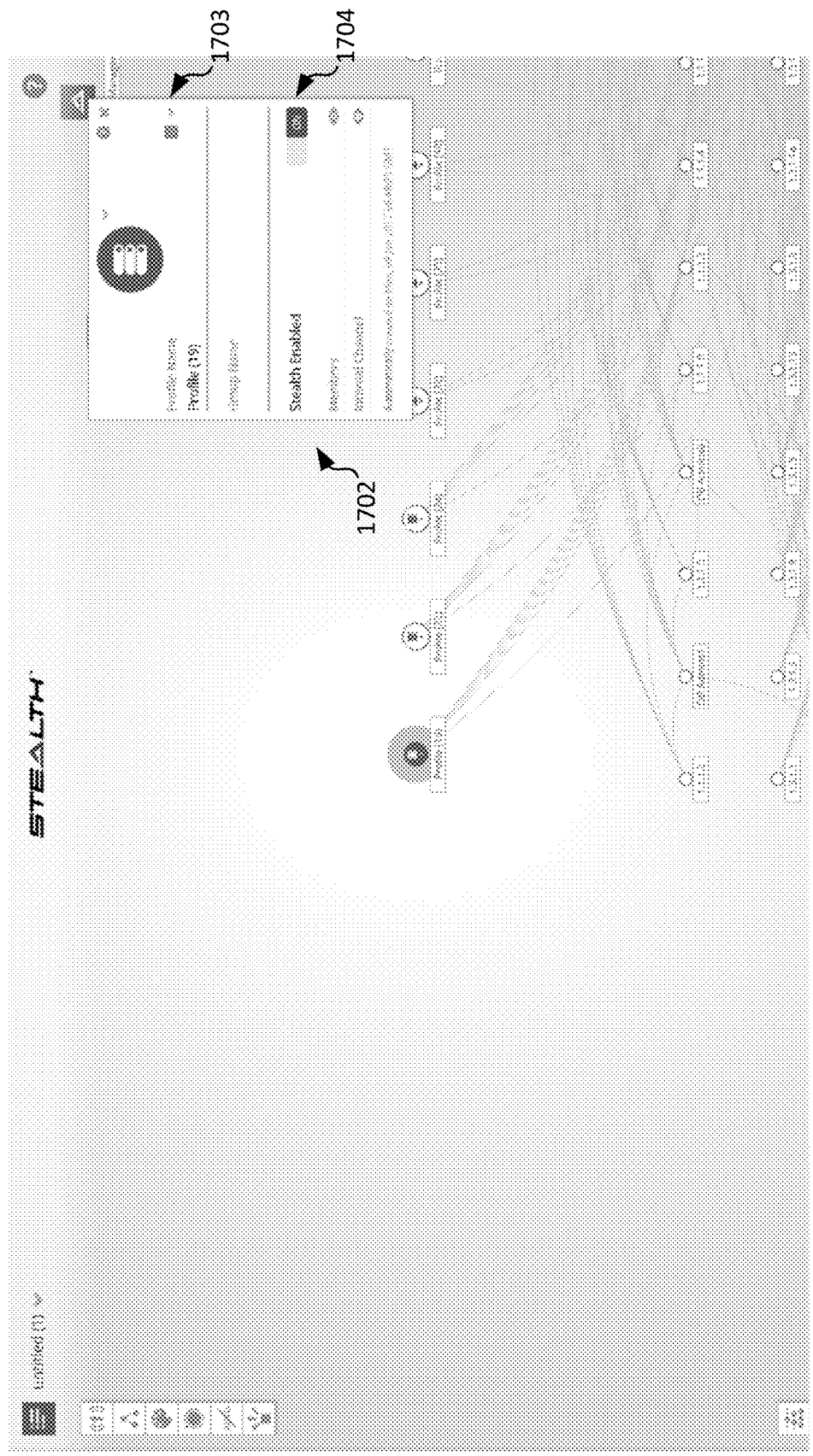
FIG. 17 illustrates a portion of the configuration user interface of FIG. 16, in which a particular profile is selected and security details are enabled/disabled in association with the plurality of nodes included in the profile, according to an example embodiment.

FIG. 16 is a configuration user interface 1600 of an enterprise security management configuration tool in which various profiles are grouped by affinitization, according to a further example embodiment. In this example, a significantly larger number of profiles exist, as well as a plurality of nodes that are not included in the profiles. As such, the configuration user interface 1600 can represent, in some cases, an affinitization of nodes into profiles in which an affinity threshold is higher than that selected resulting in the logical configuration depicted in FIG. 15. In either arrangement, however, a particular profile can be selected and customized, thereby customizing the underlying attributes of nodes included in that profile. As illustrated in FIG. 17, a portion 1700 of the configuration user interface 1600 is depicted that illustrates security details for that profile. In particular, the user interface portion 1700 includes a profile attributes region 1702 that includes a selectable icon, an editable profile name and status indicator 1703, and a group name region in which a name of a group of profiles can be collected. Additionally, a security toggle switch 1704 allows a user to enable or disable security for that profile (in this example shown, the security corresponding to Stealth-based security, as noted above.) Additionally, selectable menus listing the members of the profile, and channels shared among those members, are provided within the profile attributes region 1702.

Figure 18:
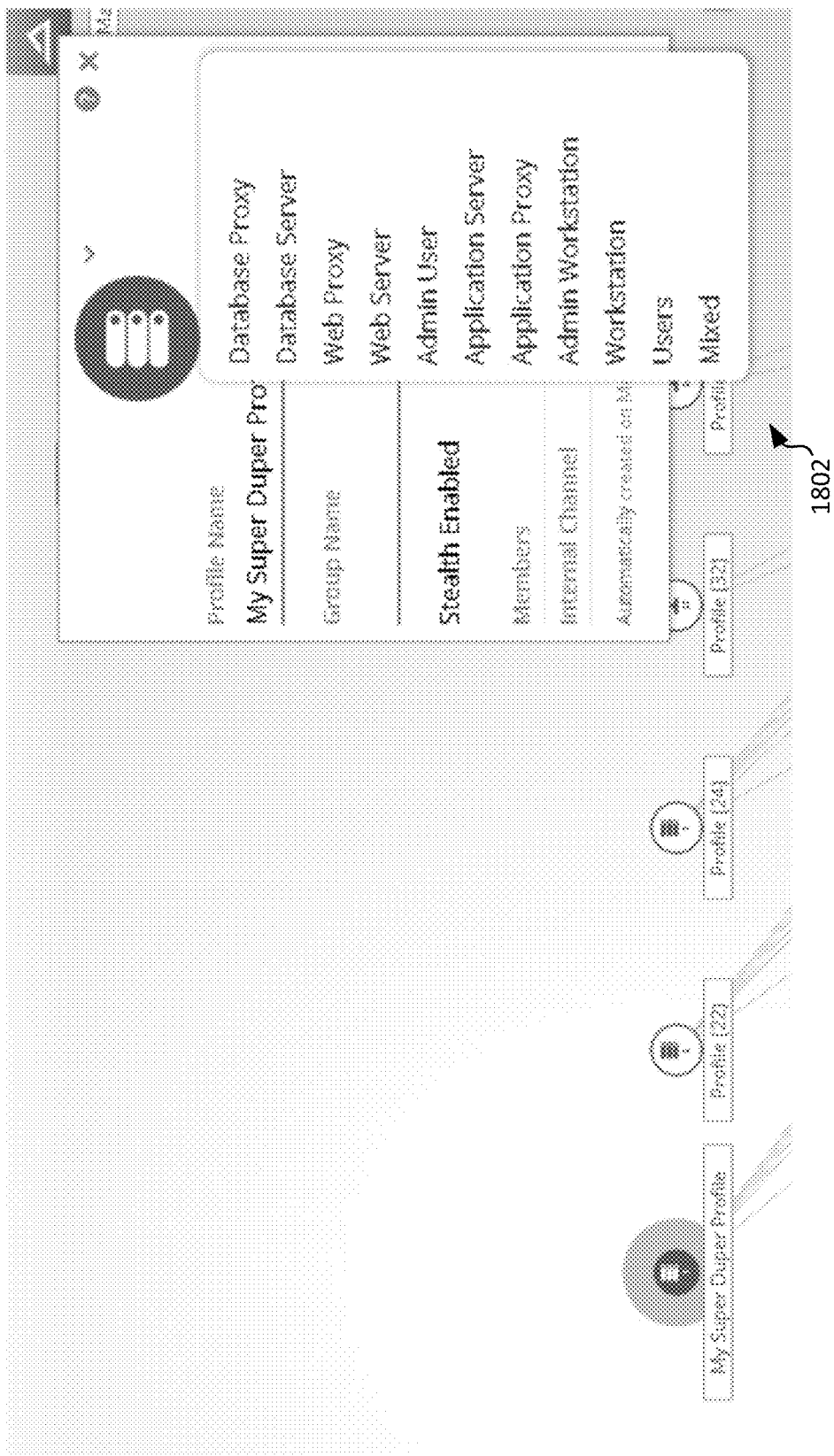
FIG. 18 illustrates a portion of the configuration user interface of FIG. 16, in which a particular profile is selected and profile types can be assigned, according to an example embodiment.

FIG. 18 illustrates the portion 1700 of the configuration user interface 1600 of FIG. 16, in which a particular profile is selected and profile types can be assigned, according to an example embodiment. In this example, the selected profile of FIG. 17 has had a profile name edited, and the selectable icon has been selected, resulting in display of a drop-down menu 1802 allowing a user to select a particular type of device represented by the nodes within the profile. As shown, the profile types can include, for example, a database proxy profile, a database server profile, a web proxy profile, a web server profile, an admin user profile, an application server profile, an application proxy profile, an admin workstation profile, a workstation profile, a users profile, and a mixed profile. Other profile types could be defined as well.

Figure 19:
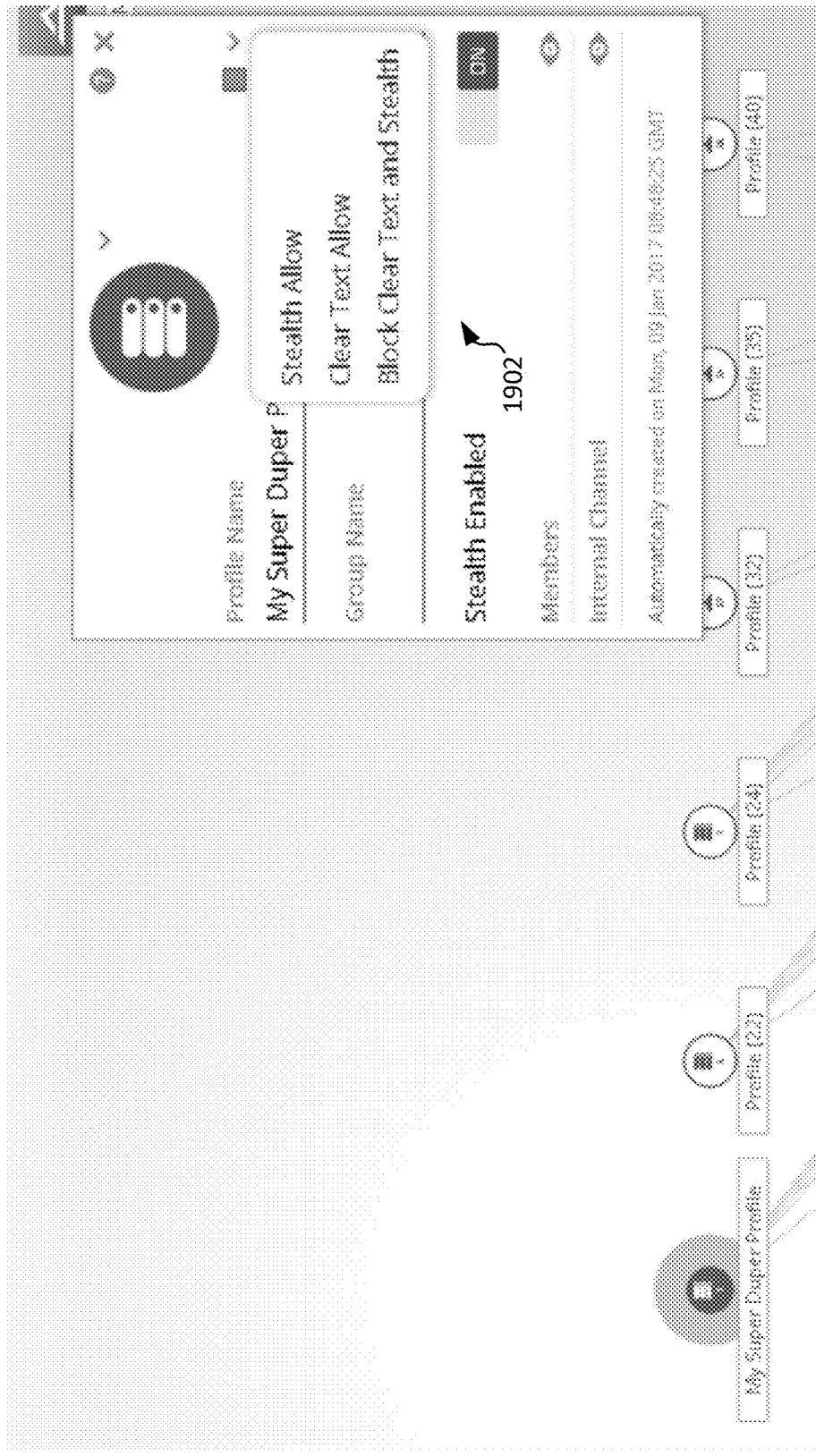
FIG. 19 illustrates a portion of the configuration user interface of FIG. 16, in which a particular profile is selected and security settings can be selected, according to an example embodiment.

FIG. 19 illustrates the portion 1700 of the configuration user interface 1600 of FIG. 16, in which a particular profile is selected and profile types can be assigned, according to an example embodiment. In this example, the selected profile of FIG. 17 has had the status indicator 1703 selected, causing display of region 1902. The region 1902 allows a user to select a particular traffic filtering operation to perform at the endpoints associated with the profile. In the example shown, the options are to allow secured traffic, allow cleartext traffic, or block both secured and cleartext traffic. Other options are possible as well.

Figure 20:
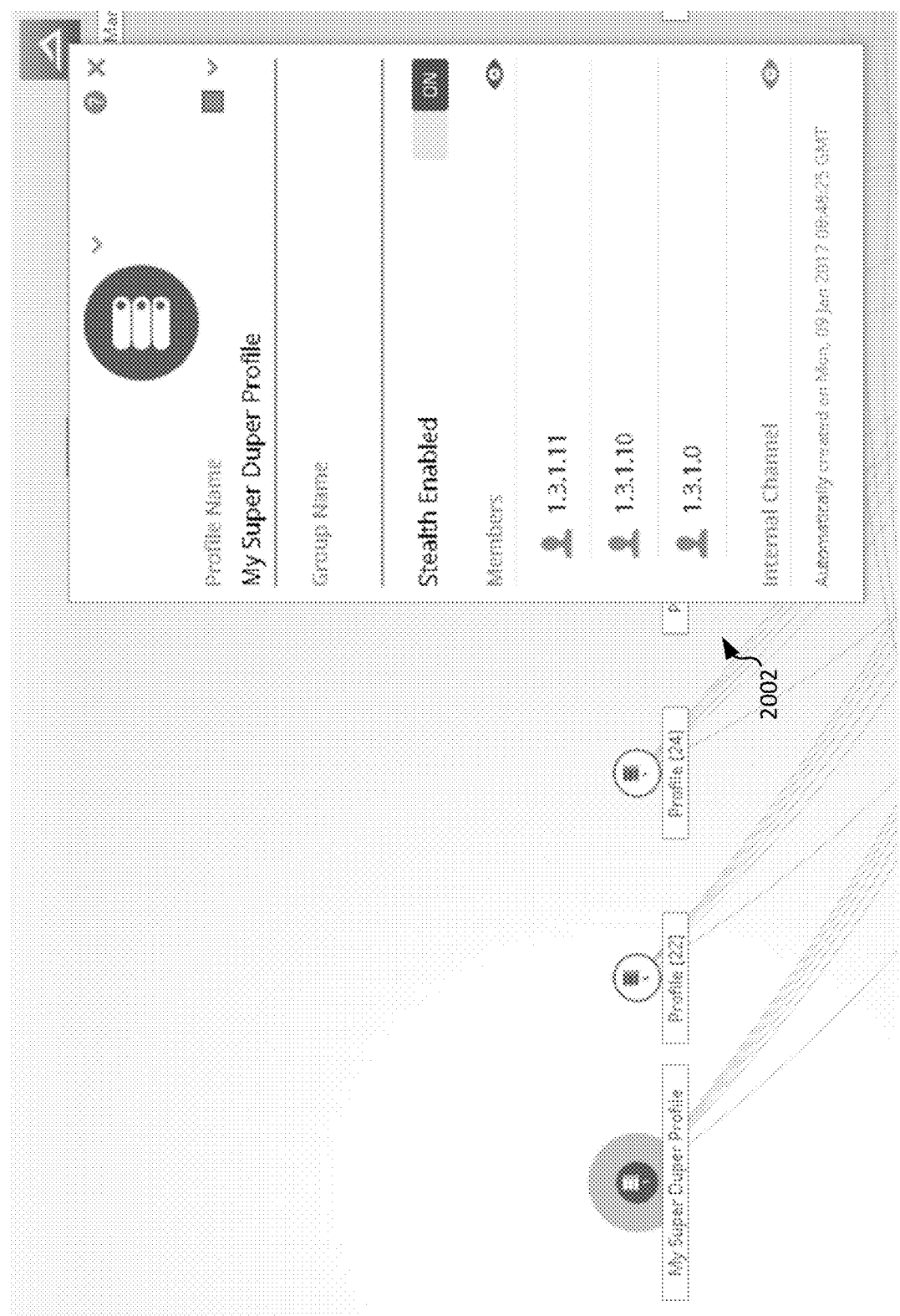
FIG. 20 illustrates a portion of the configuration user interface of FIG. 16, in which a particular profile is selected and edited, and members of the profile illustrated, according to an example embodiment.

FIG. 20 illustrates the portion 1700 of the configuration user interface of FIG. 16, in which members of the profile are illustrated, according to an example embodiment. In this example, selection of the members menu listing within the profile attributes region 1702 results in display of members in the members listing 2002, which is depicted by IP address of each member of the profile. Other manners of depicting those members, for example by location, computer name, unique ID, or other convention would be possible as well.

Referring to FIGS. 13-20, it is noted that use of profiles in the configuration user interface allow a user to selectively, automatically group nodes into a logical collections that is collapsed into a single icon through which security settings can be administered. Furthermore, although discussed above in the context of automatically created profiles, it is noted that profiles can be manually created as well by manually forming profiles with a formation tool, and grouping nodes within that profile. This can be done irrespective of the concordance data associated with each node, for example if it is known by a user that two nodes will have common security rights, although having different roles and/or communication links or channels.

III. Solution Definition within Enterprise Security Management Configuration Tool Referring now to FIGS. 21-30, details regarding defining a solution within the enterprise security management configuration tool are provided. As noted above, while a profile represents a plurality of similarly-situated nodes within an enterprise network, a solution will typically correspond to two or more profiles of nodes that interact in a particular way that makes common security policies advisable, or likely. One example of such a situation is a case in which a user application is hosted at an application server within the enterprise network but which accesses data from a database server, and presented to the user via a web server front-end. In such situations, if the data in the database server is to be secured, each of those different profiles should be secured to ensure that the data remains secured no matter what application server node, database server node, or other network equipment receives or relays such data. A solution can therefore be defined within the enterprise security management configuration tool as a convenient way to collectively manage such nodes within the enterprise network.

Figure 21:
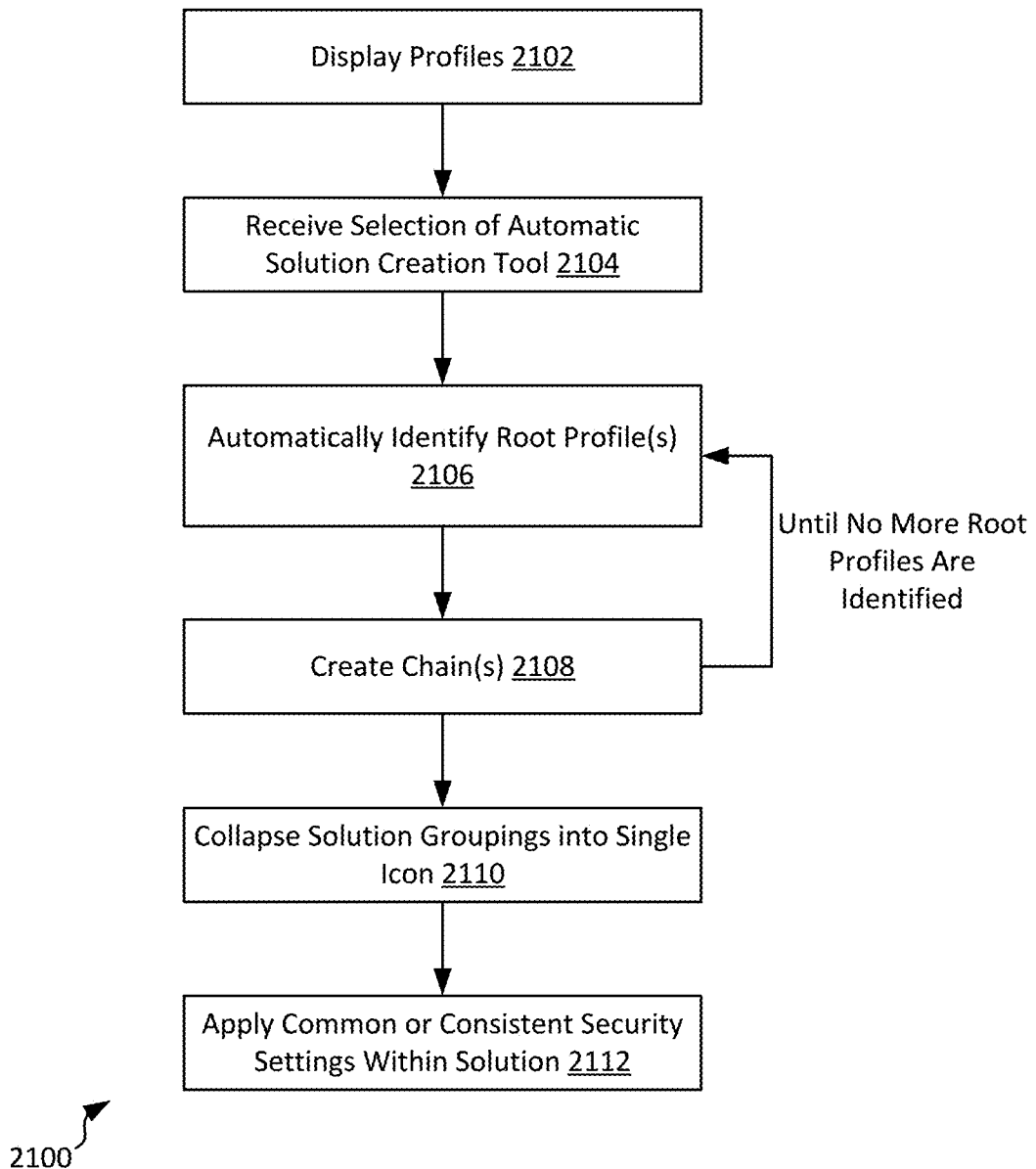
FIG. 21 is a flowchart of a method for automatically forming solutions representing logical interconnections of profiles, according to an example embodiment of the present disclosure.

Referring first to FIG. 21, an example method 2100 is shown for automatically forming solutions representing logical interconnections of profiles, according to an example embodiment of the present disclosure. In the example shown, the method 2100 includes display of a plurality of profiles (step 2102), for example as seen above in connection with FIGS. 13-20. A user can view those profiles, in a configuration user interface and can select a tool for creation of solutions automatically. The method 2100 can receive that selection (step 2104), and will initiate a process to automatically identify one or more root profiles within the set of profiles included in the project as displayed (step 2106). In general, identifying root profiles includes identifying a source of data that may need to be secured, and grouping profiles that would likely retrieve and/or process that data for use by an end user. One example method of identifying root profiles is discussed in further detail below in connection with FIG. 22.

In the example shown, for each root profile identified, one or more chains of related profiles are associated with that root profile (step 2108). The chains of related profiles generally correspond to the profiles that are interconnected with the root profile as evidenced in concordance data, and reflected graphically by channels connected to the root profile in the configuration user interface (e.g., between the root profile and a profile of one or more endpoints). The identification of a root profile and subsequent creation of chains continues until no more root profiles can be automatically identified according to predetermined rules for identifying root profiles. At that point, (or during the solution creation process), each solution, including a root profile and one or more chained profiles, can be collapsed into a single "solution" icon (step 2110). The solution icon can be selected and expanded to show the profiles included within the solution, as well as the channels among solutions which are persisted when the profiles are included within the solution. Additional details regarding graphical depiction of, and use of, such solutions, are provided below in connection with FIGS. 22-30.

Once a user has created one or more solutions, that user can select and modify various security settings for each of the profiles included in the solution, for example by using a variety of graphical tools (step 2112). Details regarding manipulation of such a solution-based graphical user interface to select security settings for a specific profile and/or node are discussed further below in connection with details regarding the configuration user interface.

Figure 22:
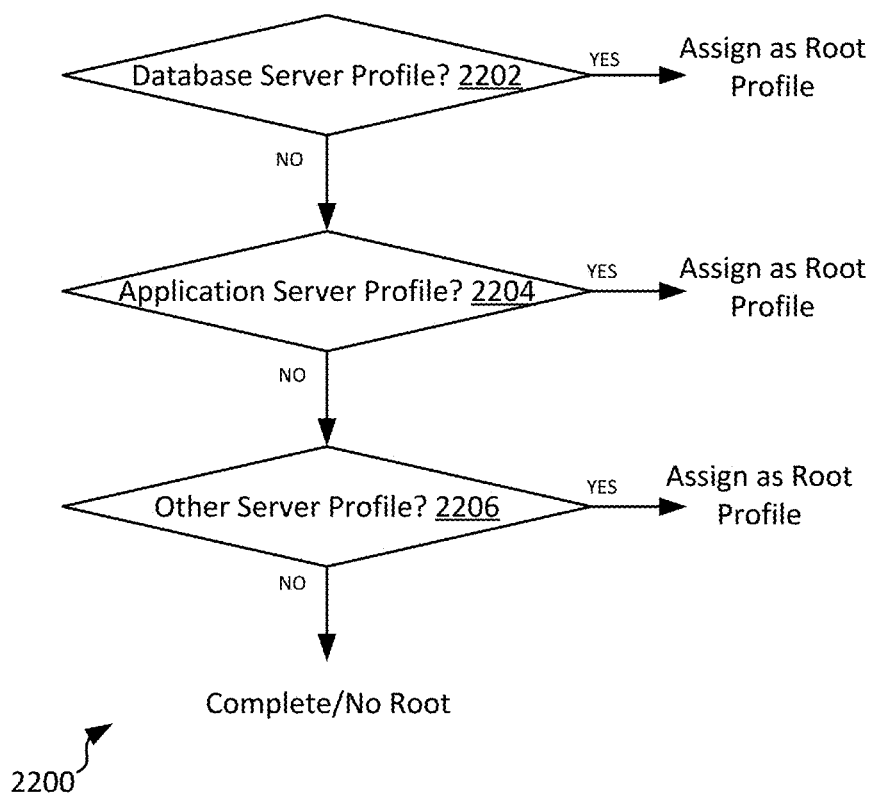
FIG. 22 is a flowchart of a method for automatically identifying a root profile of a solution, according to an example embodiment of the present disclosure.

Referring now to FIG. 22, an example method 2200 of identifying a root profile when performing an automated solution creation process is shown, according to an example embodiment. The method 2200 can be performed, for example, as part of the method 2100 for automatically forming solutions described above (e.g., as one example embodiment of the process performed in step 2106).

In the embodiment shown, the method 2200 includes determining whether there exists a profile of a database server (at operation 2202) that is not part of a currently-formed solution. If so, that database server will be assigned as a root profile. If no database server exists separately from a solution, the method 2200 determines whether an application server profile exists that is not part of a solution (at operation 2204). This may be the case where an application is hosted but does not require some requisite data set—e.g., it provides a service to a user node, where the user node may provide any data required of the application. In this case, the application server profile may be assigned as a root profile.

If no application server exists outside of an existing solution, the method 2200 can include, in the embodiment shown, determining if another type of server profile exists (at operation 2206). This can include, for example, a web server profile, or an email server profile. In such a case, that profile may be identified as a root profile. If no such server profile exists, the method 2200 may complete, indicating that no further candidate root profiles exist for purposes of automatically creating a new solution.

It is noted that, in some embodiments, fewer than all of the operations 2202-2206 may be performed, depending on the selected implementation. For example, in some cases, the method 2200 may be implemented such that only database server profiles and application server profiles are identified as candidate root profiles of a solution, and other types of profiles are not considered for automatic solution creation. In still further versions, only database server profiles might be considered candidate root profiles. However, it is noted that in such cases, other solutions might be able to be created manually, for example using the process outlined below in association with FIGS. 27-30.

Figure 23:
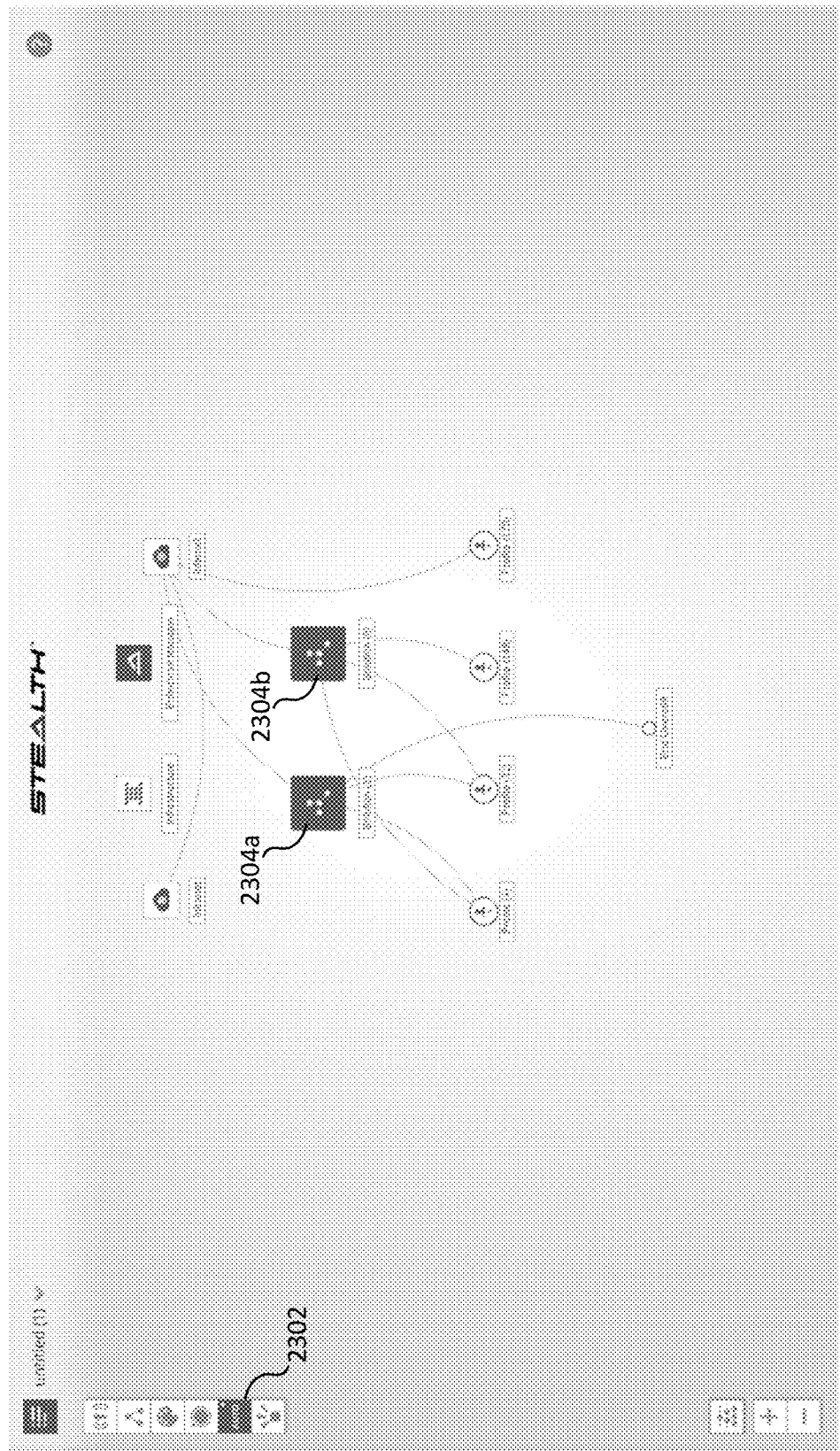
FIG. 23 is a configuration user interface of an enterprise security management configuration tool in which solutions are automatically created using a solution creation tool from a tool palette, according to an example embodiment.

Referring now to FIG. 23, a configuration user interface 2300 is shown that can be generated by an enterprise security management configuration tool. The configuration user interface 2300 generally represents a state of the tool after an automatic solution generation tool 2302 is selected from the tool palette 802. As seen in the configuration user interface, two solutions 2304*a-b* are depicted, each of which are accessed by user profiles and nodes, and configured to communicate with the internet (as depicted by the channels).

Figure 24:
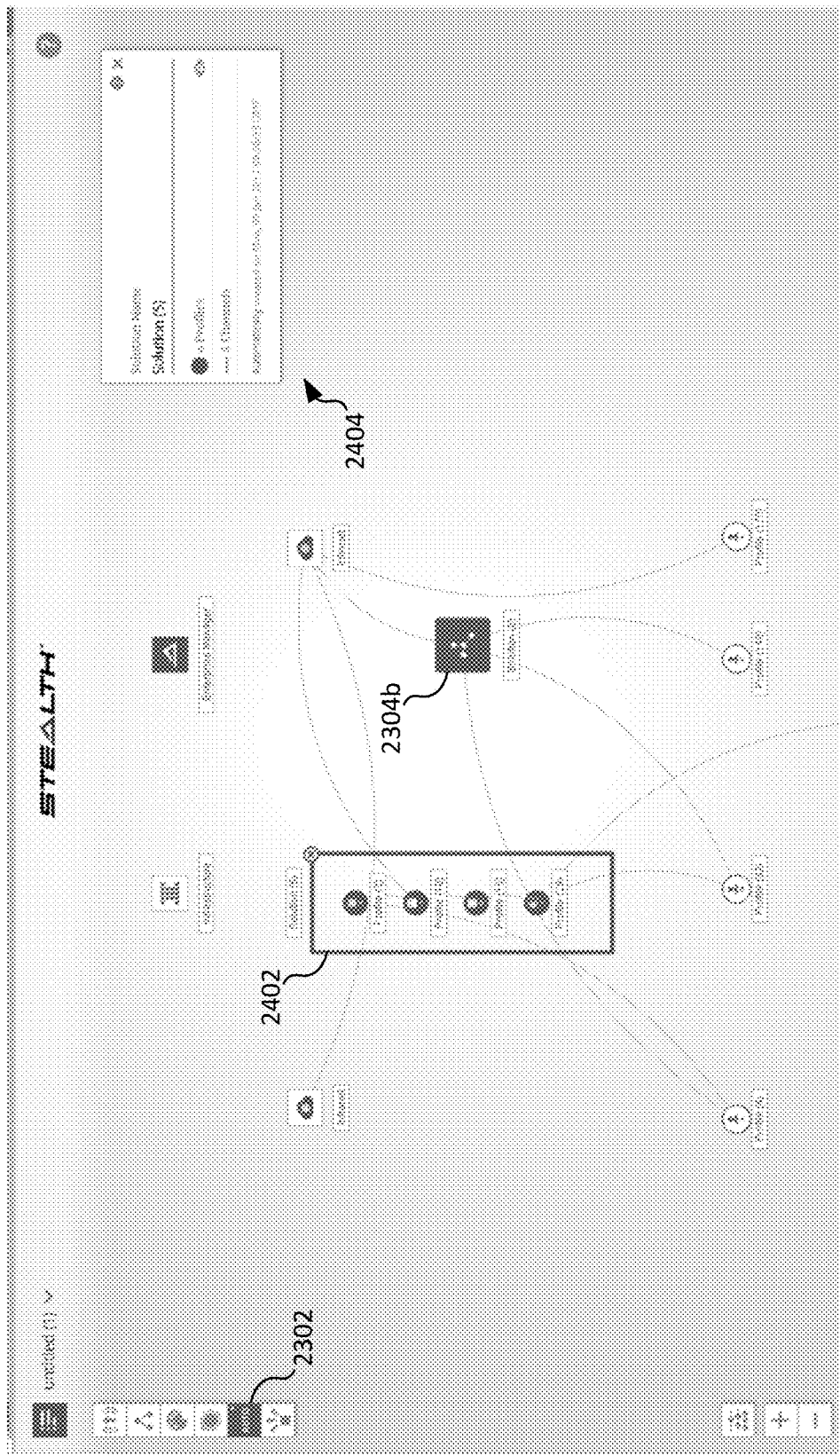
FIG. 24 illustrates the configuration user interface of FIG. 23 with an expanded solution, according to an example embodiment.
Figure 25:
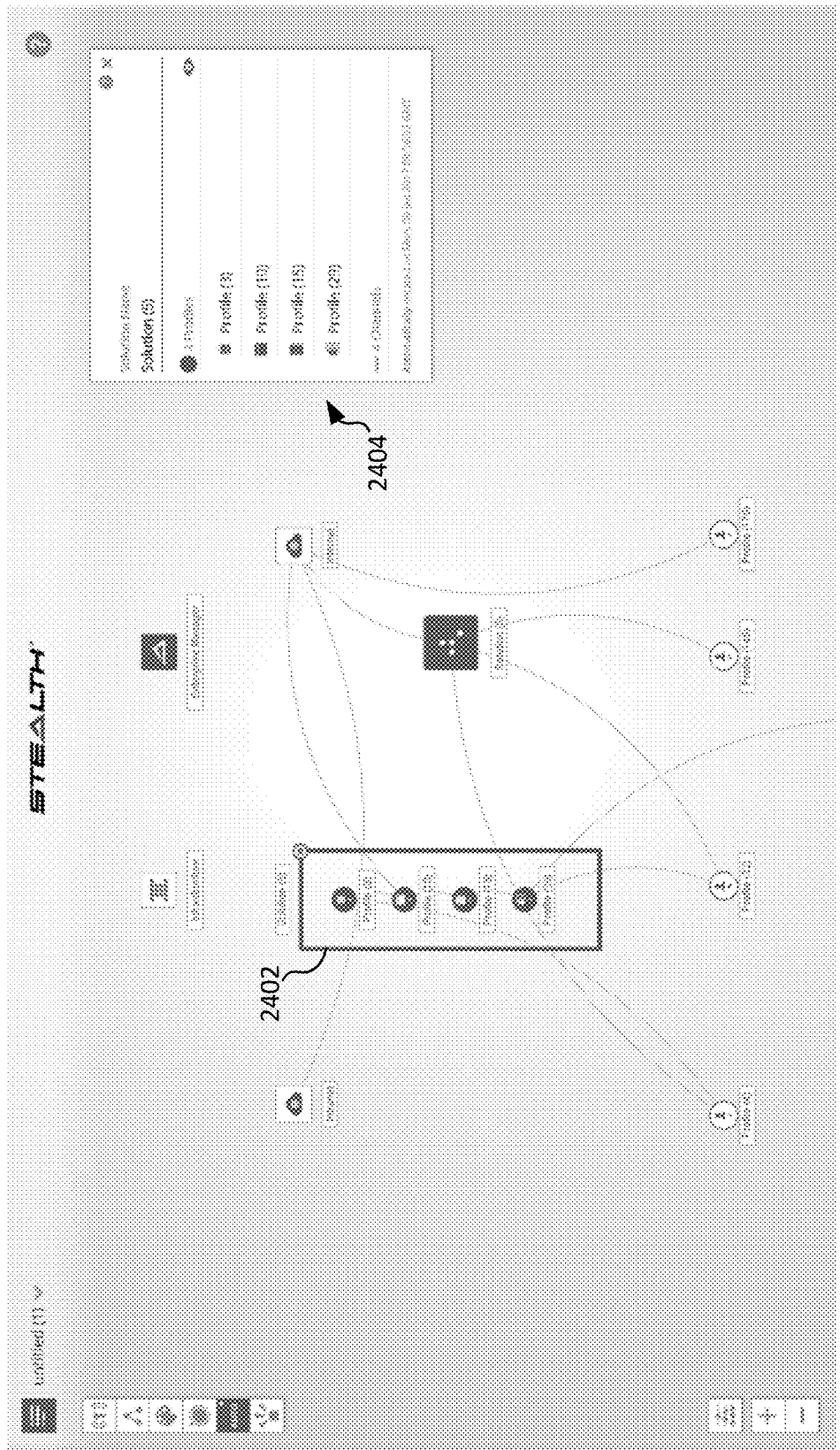
FIG. 25 illustrates the configuration user interface of FIG. 23 with an expanded solution showing member profiles, according to an example embodiment.

FIG. 24 illustrates the configuration user interface 2300 of FIG. 23, but with one of the solutions 2304*a* expanded to show a solution topology region 2402 and solution attribute window 2404. The solution topology region 2402 displays, instead of a single icon associated with the solution, each of the underlying profiles and interconnecting channels among the profiles that are included in the solution. The solution attribute window 2404 illustrates a name of the solution as well as a drop-down menu for each of the profiles and channels included in the solution. In addition, the solution attribute window 2404 can include various details regarding when and how the solution was created or last updated, for example to indicate that the solution was created using the automatic solution generation tool 2302. FIG. 25 illustrates expansion of one of the drop down menus within the solution attribute windows to illustrate the four profiles included within the solution topology region 2402.

Figure 26:
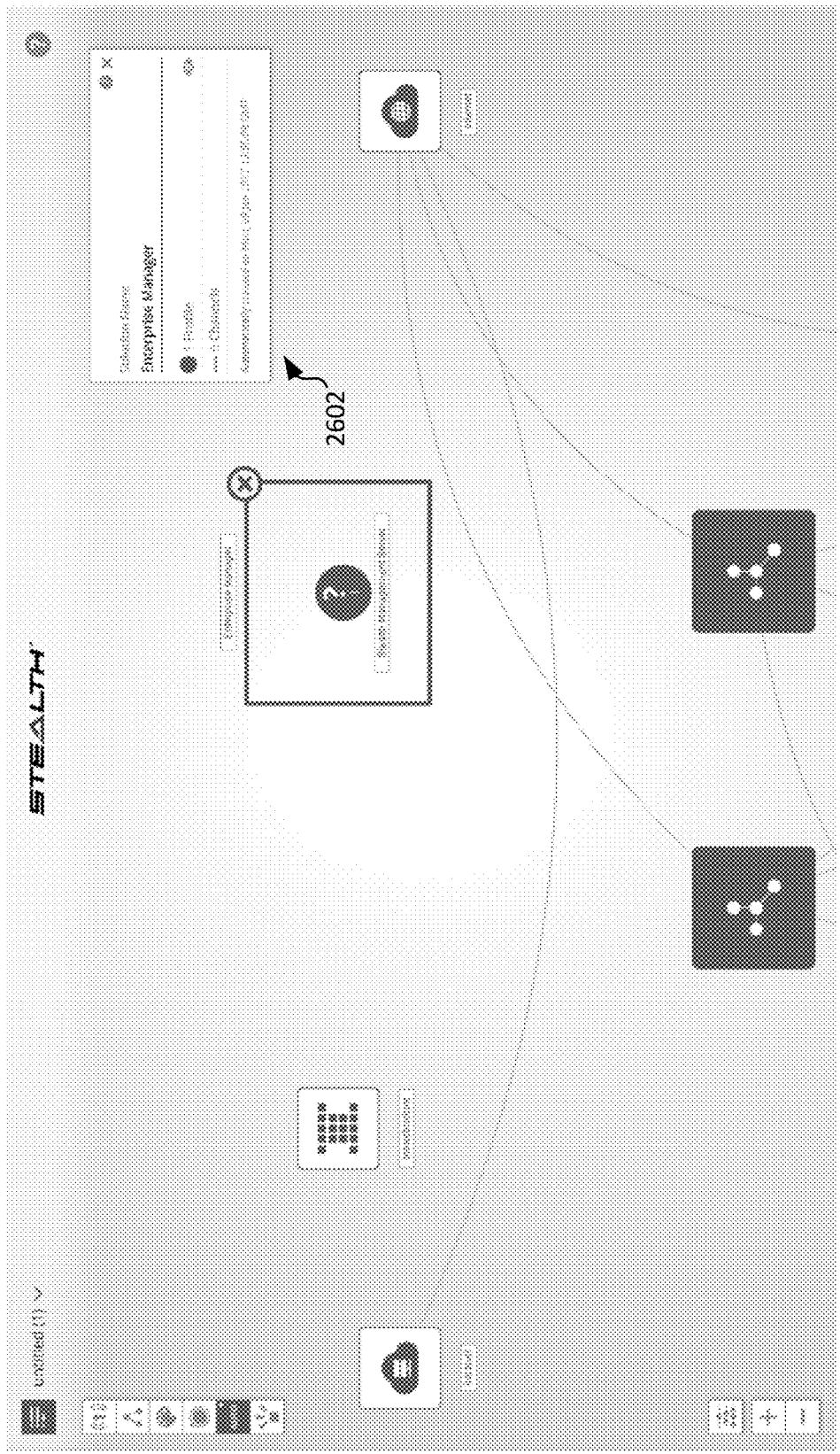
FIG. 26 illustrates the configuration user interface of FIG. 23 with a selected solution representing an enterprise management server, according to an example embodiment.

FIG. 26 illustrates the configuration user interface 2300 of FIG. 23 with a selected solution representing an enterprise management server, according to an example embodiment. In this example, the solution as selected represents one of the automatically-present solutions, which corresponds to the management server 120 included within an enterprise network. In the example shown, upon selection of the enterprise manager solution an attribute window 2602 is displayed that illustrates details regarding the management server, as with the other solutions created within the configuration user interface.

Figure 27:
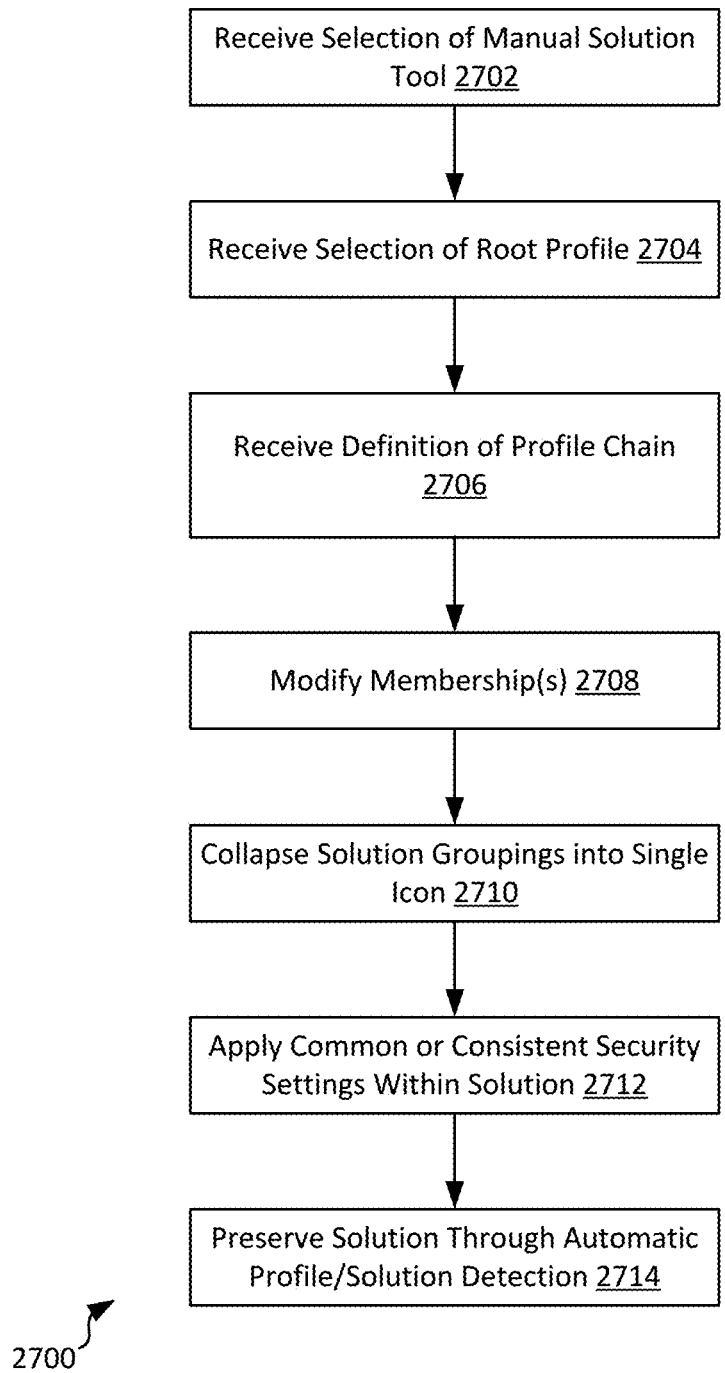
FIG. 27 is a flowchart of a method for manually modifying associations of nodes into profiles and/or solutions, according to an example embodiment of the present disclosure.

As mentioned above, solutions can be created within the enterprise security management configuration tool using the configuration user interface by methods other than automatic creation. As illustrated in FIGS. 27-30, manual creation of solutions is possible as well. FIG. 27 illustrates a method 2700 for manually forming solutions by modifying associations of nodes into profiles and/or solutions, according to an example embodiment. In the example shown, the method 2700 includes receiving selection of a manual solution creation tool (step 2702), for example from a tool palette in a configuration user interface.

Figure 30:
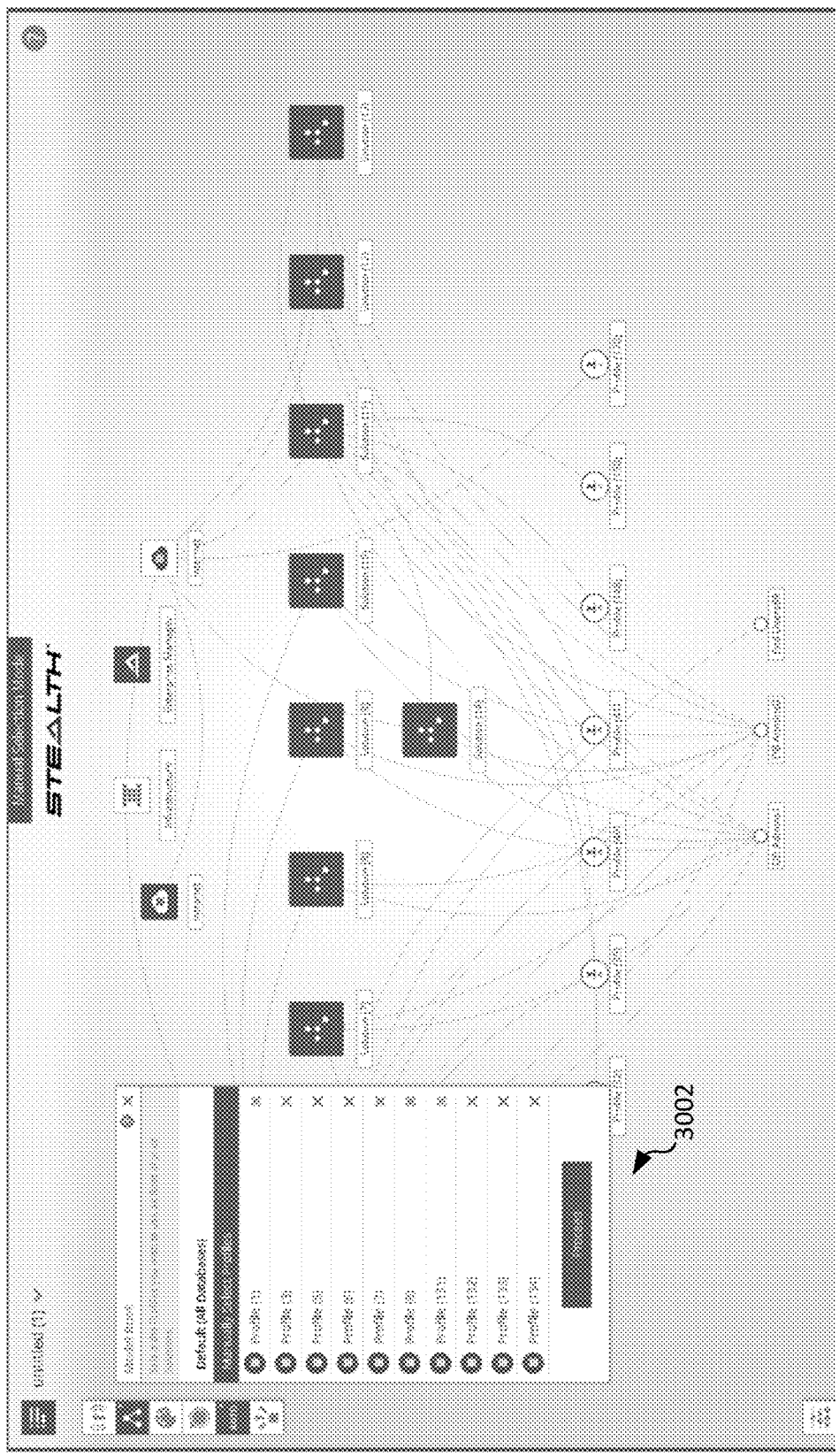
FIG. 30 is a configuration user interface of an enterprise security management configuration tool in which a user can select a root profile of a manually-created solution, according to an example embodiment.

Once a manual solution creation tool is selected, the method 2700 includes receiving selection of a root profile (step 2704) from among the available profiles included in an enterprise topology. The selection of a profile can be, for example, a selection of a profile from a list of profiles not affiliated with a solution, such as is seen in FIG. 30.

In the embodiment shown, once a root profile is selected, the method 2700 includes receiving a definition of a profile chain (step 706). Defining a profile chain can be performed in a number of ways. For example, in one embodiment, a container can be displayed around the root profile, with associated profiles connected to that root profile from outside that graphical container via channels. A user can select one or more connected profiles to drag and drop into the container, thereby adding that profile to the solution. In another embodiment, a menu similar to that shown in FIG. 30 for selecting a root profile can be used, displaying candidate chained profiles for selection. Still further, a partially automatic profile creation can be used, in which, once a root profile is identified, chained profiles can be automatically identified by the enterprise security management configuration tool.

In some embodiments, the method 2700 optionally further includes modification of memberships in the solution (step 2708). This can include, for example one or more modification to memberships of profiles within the solution, or nodes within one or more of the profiles. Such modifications can be performed manually using the configuration user interface of the enterprise security management configuration tool. As discussed in further detail below, in some such embodiments, any manual manipulation in the configuration user interface of associations between profiles into or out of a solution, or nodes into or out from a profile, or security settings selected for a given solution or profile, are considered "sticky" or "locked" and are therefore persistent through any automated changes to profiles or solutions. In other words, any such manual manipulations will not be overridden by, for example, a subsequent use of the automatic affinitization tool or automatic solution creation tool from the tool palette, even when during typical operation of such tools, the relevant (previously-manipulated) node or profile would have otherwise been included in a profile (in the case of a node) or solution (in the case of a node or profile).

Once a solution is defined, the method 2700 further includes collapsing each of the groups of profiles into a single solution group represented by a single icon (step 2710). Accordingly, the solution can simplify the appearance of the enterprise network's logical interconnections, as noted above.

Additionally, the method 2700 further include applying common, or consistent, security settings for each of the profiles within the solution, to ensure proper access rights to data across the profiles included in the solution (step 2712). As noted above, by grouping profiles into a solution representing logically interconnected profiles, those profiles can have similar security settings applied thereto, thereby simplifying the deployment of security settings to the enterprise management server and associated configuration database.

Figure 28:
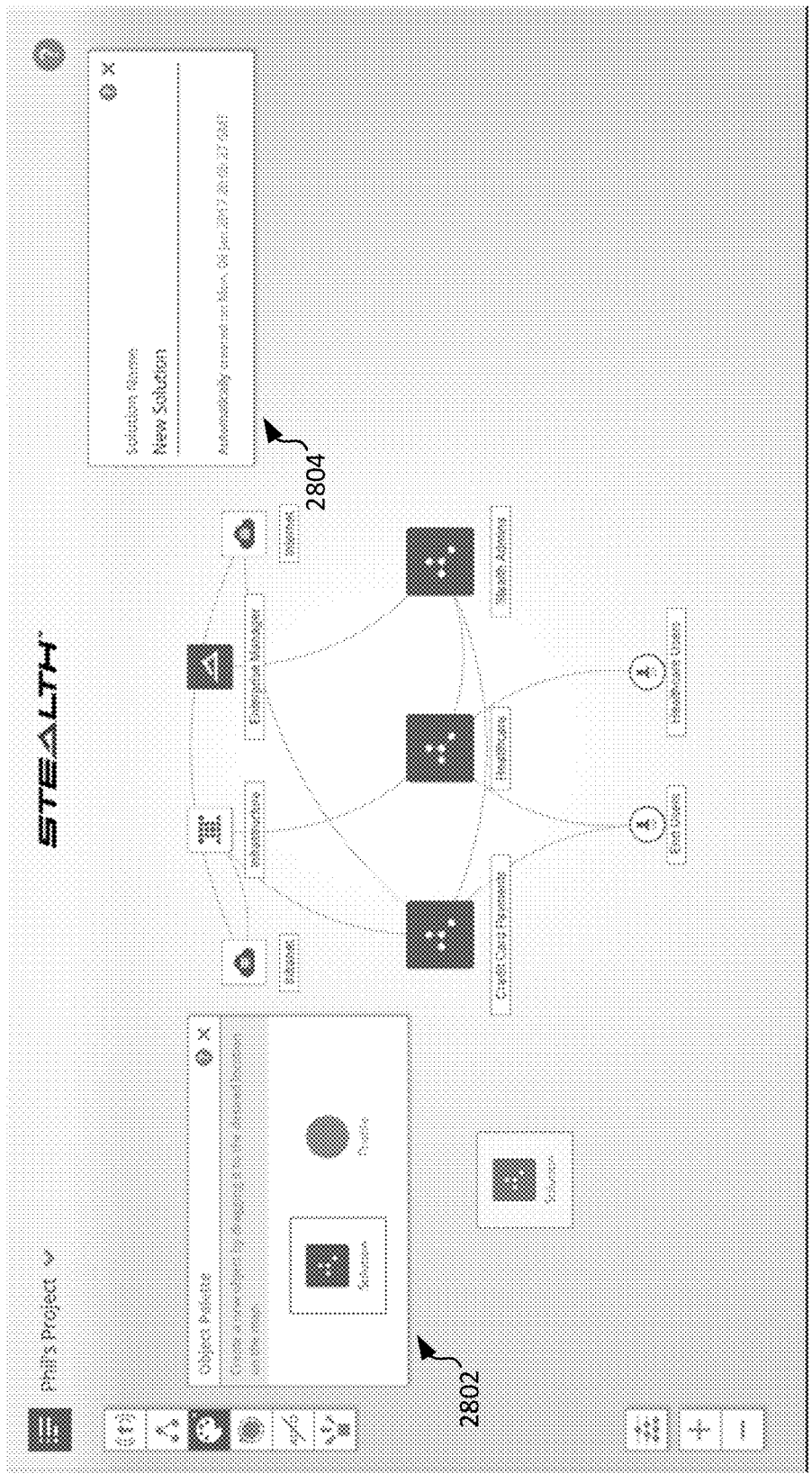
FIG. 28 is a configuration user interface of an enterprise security management configuration tool in which a solution is created using a manual solution creation option from a tool palette, according to an example embodiment.
Figure 29:
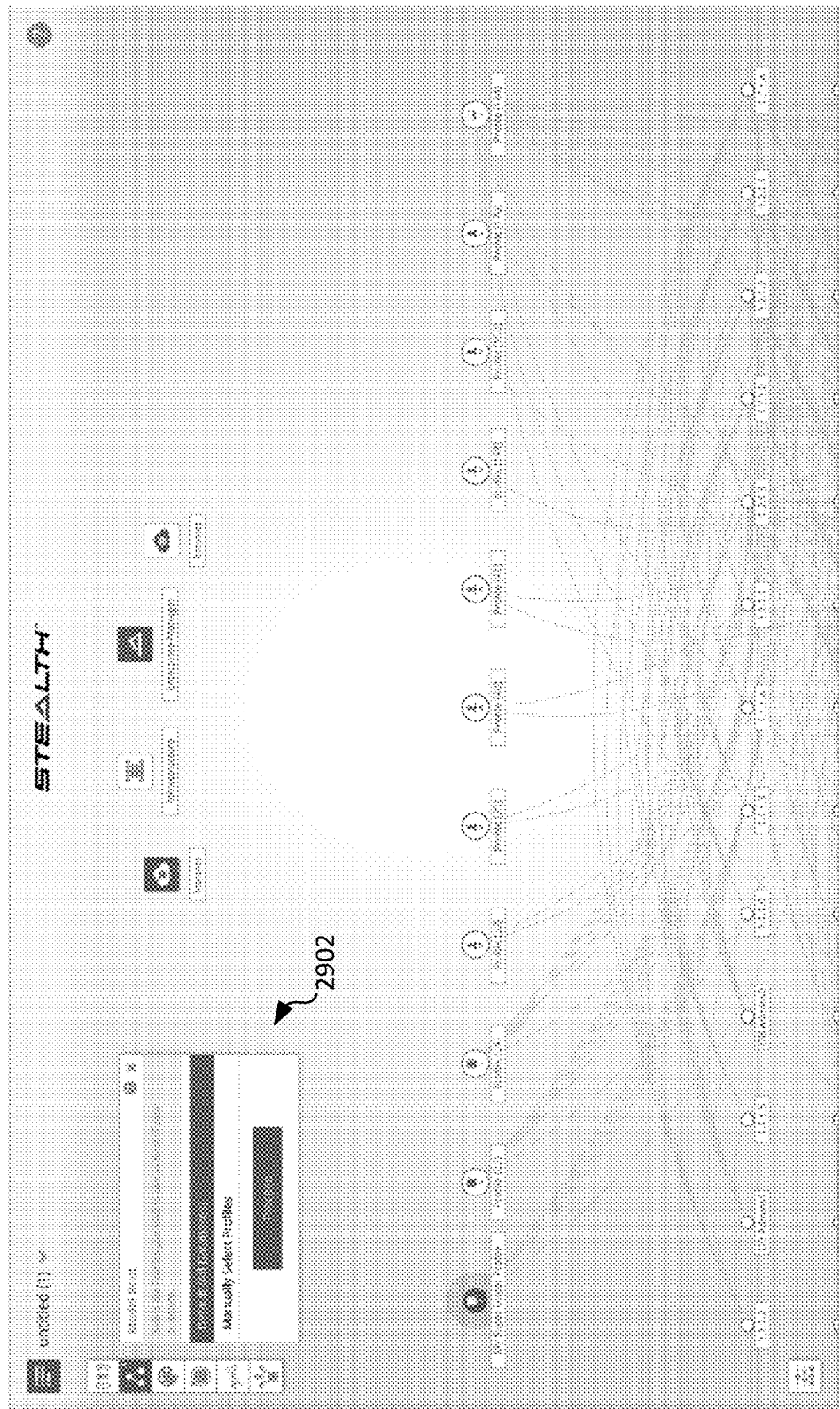
FIG. 29 is a configuration user interface of an enterprise security management configuration tool in which a user can select a method of identifying a root profile of a solution, according to an example embodiment.

FIGS. 28-30 illustrate various features within the configuration user interface to assist with manual solution creation and manipulation of solution membership by profiles included within the enterprise network. FIG. 28 is a configuration user interface 2800 of an enterprise security management configuration tool in which a solution is created using a manual solution creation option from a tool palette, according to an example embodiment. The configuration user interface 2800 illustrates an example interface that can be shown following selection of an object palette tool from a tool palette, in association with an existing enterprise network topology. As seen in FIG. 28, an object palette tool window 2802 displays an option to create either a new solution or a new profile. In this example, a new solution is selected, and is depicted as solution 2804.

An example of how to define features within a solution is seen in FIG. 29. In that figure, a configuration user interface 2900 includes a plurality of solutions, and for a selected solution, a model root tool can be selected from the tool palette, causing display of a model root window 2902. The model root window allows a user to manually select one or more profiles to be included in the solution. As seen in FIG. 30, the configuration user interface 2900 and model root window 2902 can be expanded into window 3002 to show all possible root profiles, illustrating each of the possible root profiles that can be selected as a root profile for a solution. It is noted that, optionally, the model root window can be used in a partially automatic solution creation process in which, although potential root profiles can automatically be identified (as in FIG. 21-22, above), the automated process described above could also include manual confirmation of which root profiles and/or solutions are to be created.

IV. Additional User Interface Features

Referring now to FIGS. 31-34, additional user interface features within a configuration user interface of an enterprise security management configuration tool are discussed, relative to management, simulation, and monitoring of configurations.

Figure 31:
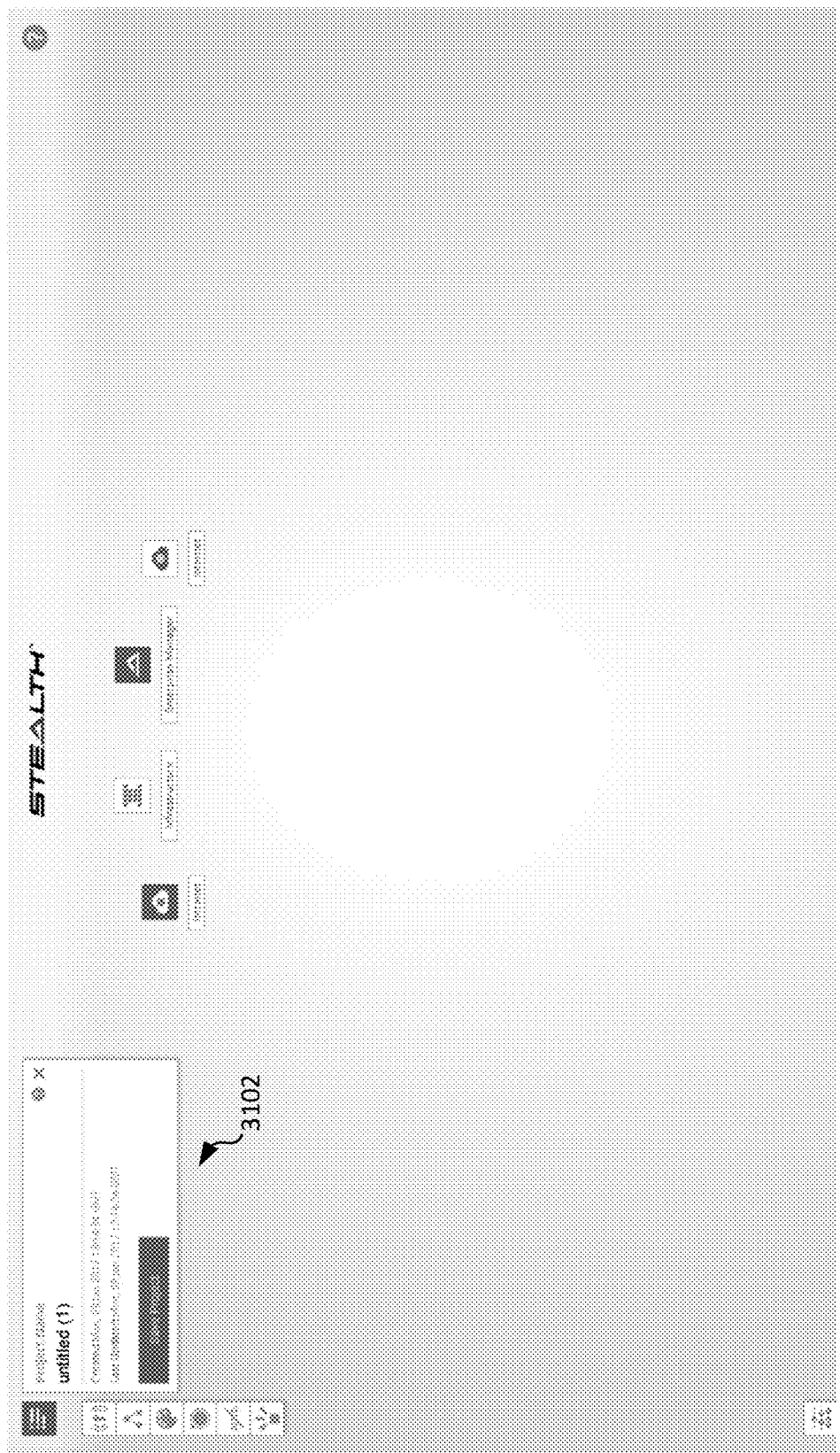
FIG. 31 is a configuration user interface of an enterprise security management configuration tool in which project details are displayed from a project menu, according to an example embodiment.

FIG. 31 is a configuration user interface 3100 of an enterprise security management configuration tool in which project details are displayed from a project menu 3102, according to an example embodiment. The project details can be edited and show information such as creation and last edit times of a particular project. A user can select, and navigate among multiple projects within the enterprise security management configuration tool.

Figure 32:
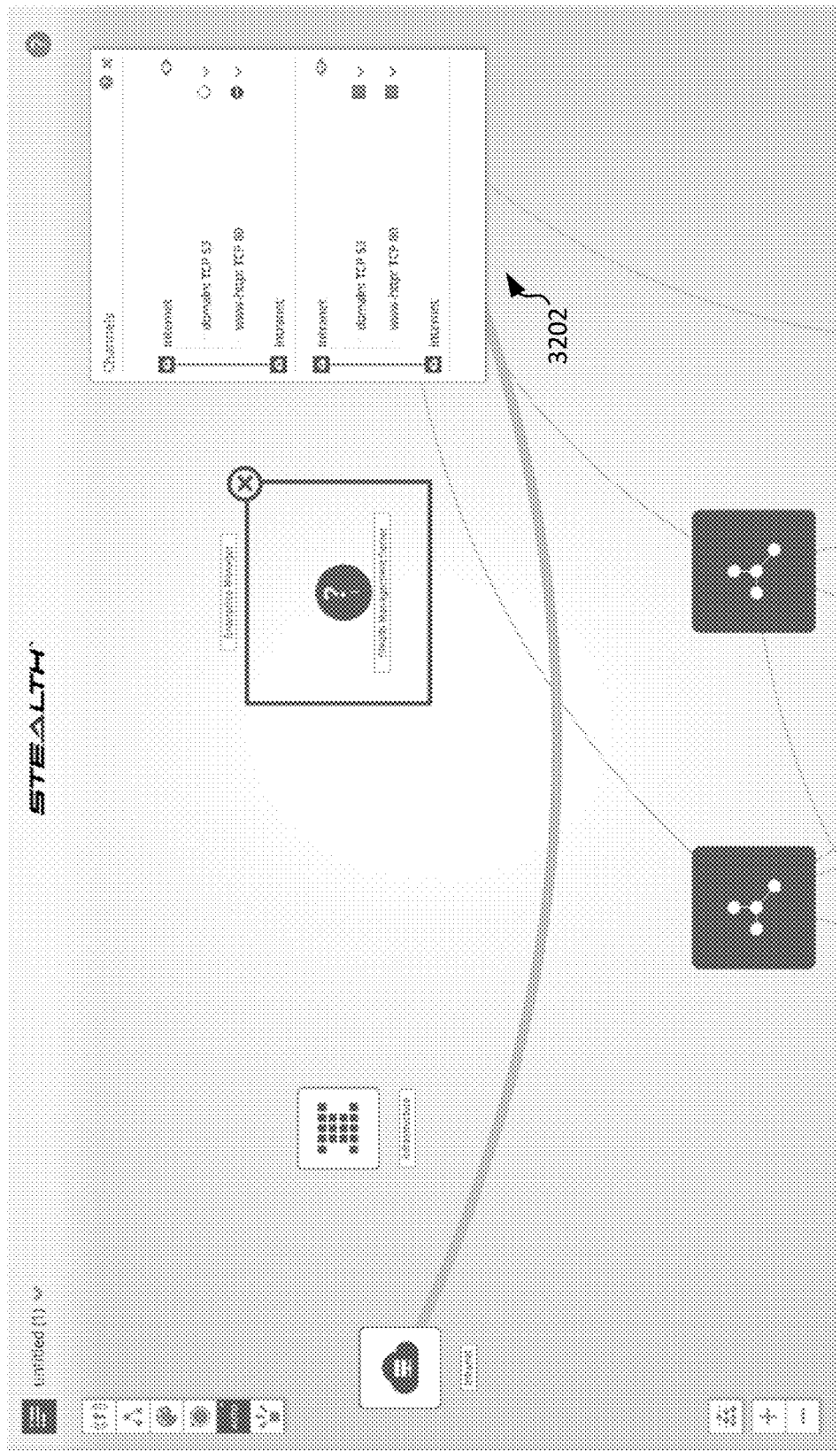
FIG. 32 is a configuration user interface of an enterprise security management configuration tool in which channel details are displayed and editable, according to an example embodiment.

FIG. 32 illustrates a portion of the configuration user interface 3100 in which details associated with a plurality of channels connected to the Internet are disclosed. The user interface 3100 includes a channel window 3202 that includes a plurality of listed connections at different ports and using different protocols/ports, as well as status indicators identifying whether the connection to those Internet sites are secured (e.g., shown as a green box indicator), not secured (e.g., as seen in the first connection, represented by the open circles), or all blocked (e.g., as seen in the second connection, represented by the closed circle icon). FIG. 32, as well as previous user interface depictions, therefore represent a modeling mode in which channel security can be viewed and modified prior to deployment.

Figure 33:
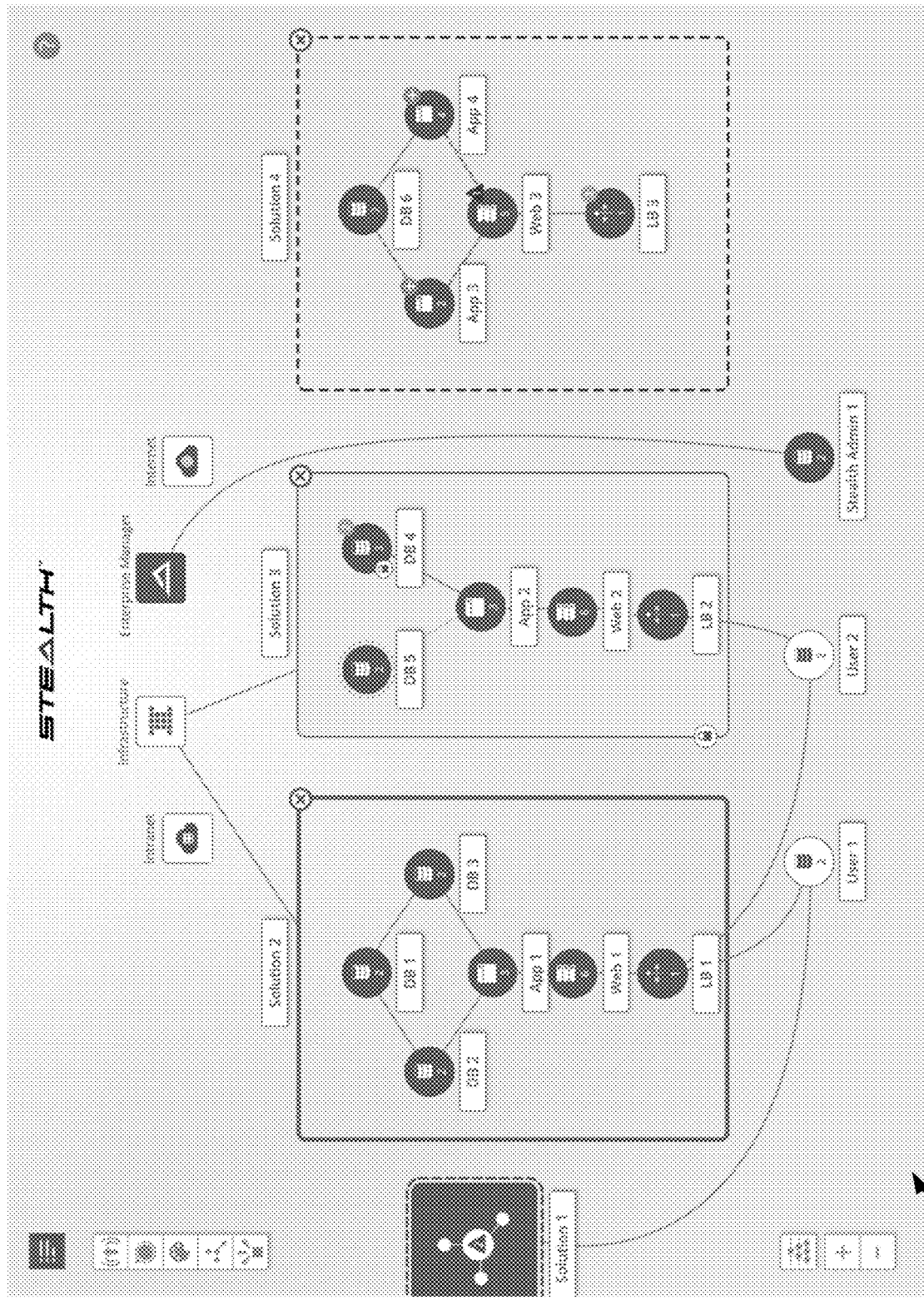
FIG. 33 is a configuration user interface of an enterprise security management configuration tool useable in a simulation mode, in which alerts can be illustrated in the various solutions defined, according to an example embodiment.

FIG. 33 illustrates a simulation mode in a configuration user interface 3300, which can be entered by a user if, for example, the user has completed design of a set of security settings within an enterprise network and the user wishes to test the consistency of such a deployment either before or after deployment. In the embodiment shown, the configuration user interface 3300 includes, for each solution, and for at least some profiles, one or more status indicators identifying a possible concern regarding either (1) a lack of security or (2) inconsistency among security settings in a particular solution, profile, or project. As seen in this example, four solutions are depicted, with solutions 1 and 4 surrounded by a red dashed line, indicating a possible lack of security within those solutions. Although solution 1 is collapsed into a single icon, solution 4 is expanded, illustrating that among a database server profile, two application server profiles, and a web server profile included in the solution, the web server profile has a possible security problem that could expose data insecurely. In particular, in some embodiments, an icon modifier in association with the profile (indicated in the example shown by a triangle in the upper right corner) can indicate a number of nodes within the profile that are affected.

Figure 34:
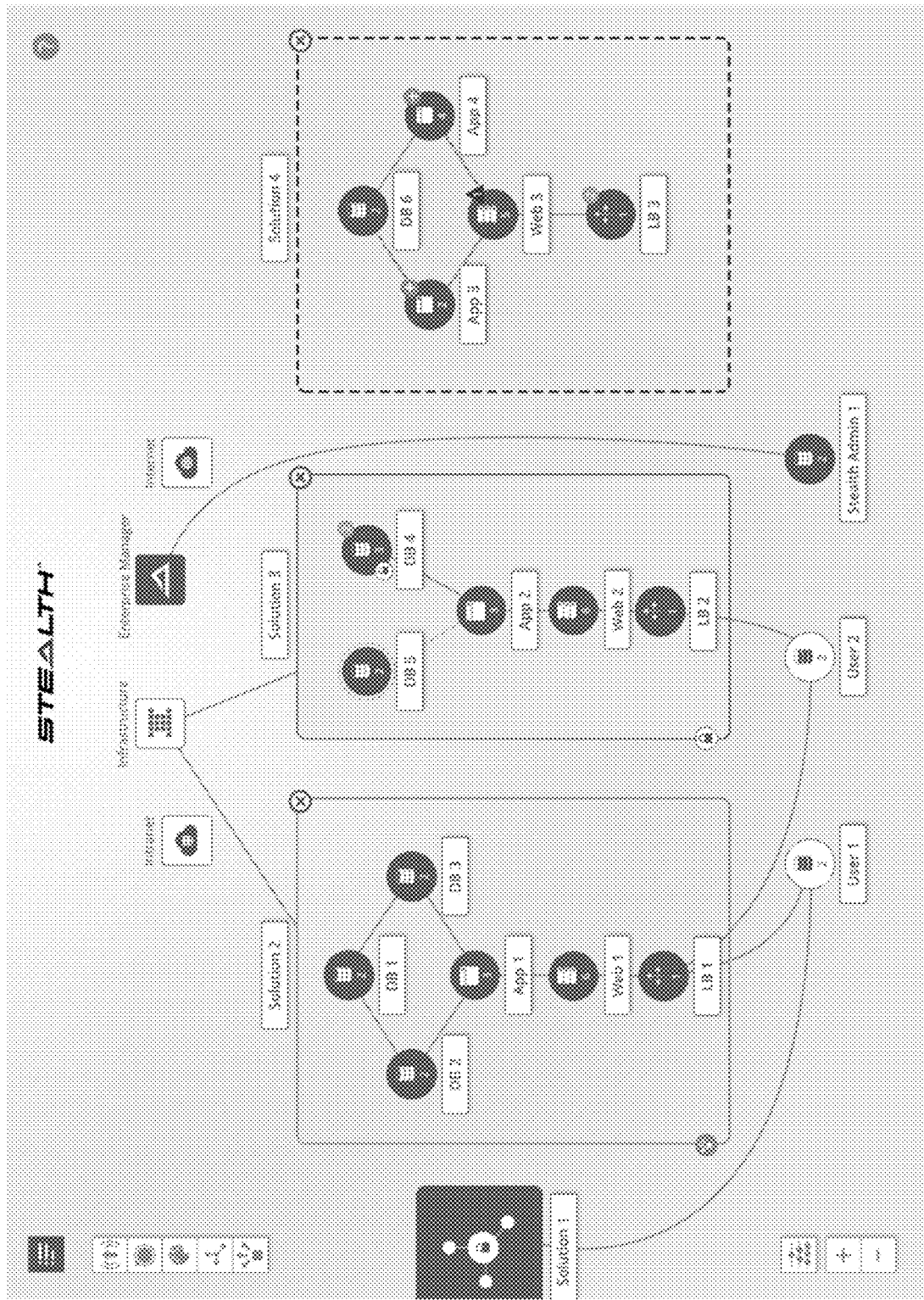
FIG. 34 is a configuration user interface of an enterprise security management configuration tool useable in a monitoring mode, in which alerts can be illustrated in the various solutions defined, according to an example embodiment.

FIG. 34 illustrates a monitoring mode of a configuration user interface 3400, according to an example embodiment. In the configuration user interface 3400 as shown, the same enterprise network is being monitored as in FIG. 33; however, in this case, rather than determining if some simulated feature exposes a security threat, the configuration user interface 3400 is configured to generate alerts in the event of an actual vulnerability after security settings have been deployed. Accordingly, although in FIG. 33 Solution 1 is indicated as a potential vulnerability due to two unsecured nodes within that solution, in FIG. 34, no vulnerability is in fact viewed, for example because no unsecured traffic is flowing through solution 1, or for a variety of other reasons.

Additionally, Solution 2 is indicated as being secured, while Solution 4 is shown as being unsecured for the same reasons as indicated in FIG. 33.

A user can, in example embodiments, swap between modes in the configuration user interface 3400, to the extent that the enterprise security management configuration tool is directly connected to enterprise computing systems having network agents installed thereon (e.g., network agent 524 of FIG. 5) to provide traffic in realtime to the tool for purposes of monitoring secured and unsecured data flows within the channels as depicted. If a data vulnerability is detected in either a simulation mode or a monitoring mode, a security administrator can elect to switch back to a modeling mode, adjust security settings, and redeploy all or a part of the project that represents that enterprise network. As noted in further detail below (and mentioned above), partial projects can be deployed, for example by selecting and deploying a single solution. Accordingly, only a portion of an entire enterprise network need be re-provisioned using the security settings that are modified.

V. Export of Solution to Enterprise Security Management Server

Figure 35:
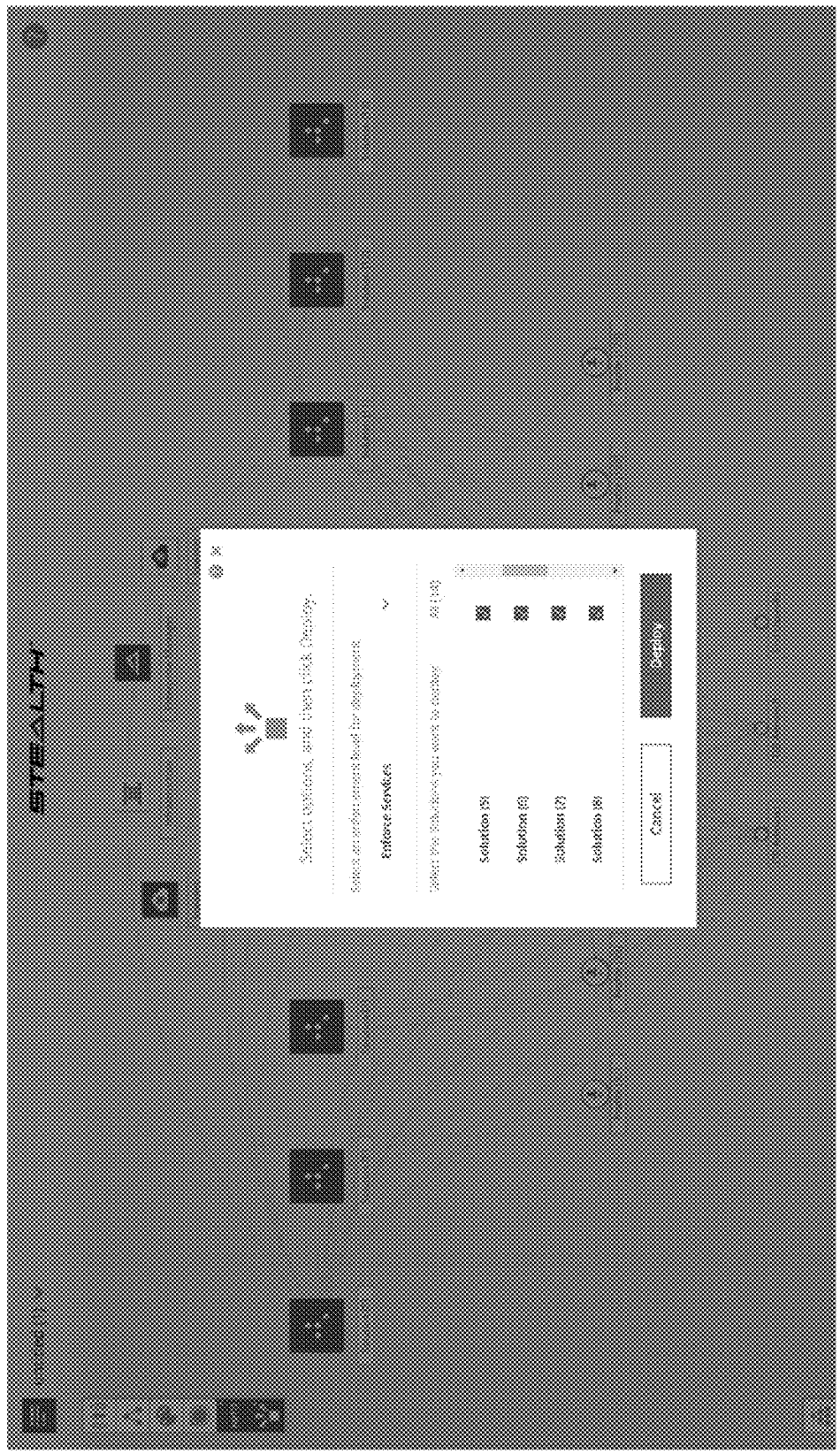
FIG. 35 is a configuration user interface of an enterprise security management configuration tool useable to export a security settings file to an enterprise management server, according to an example embodiment.
Figure 36:
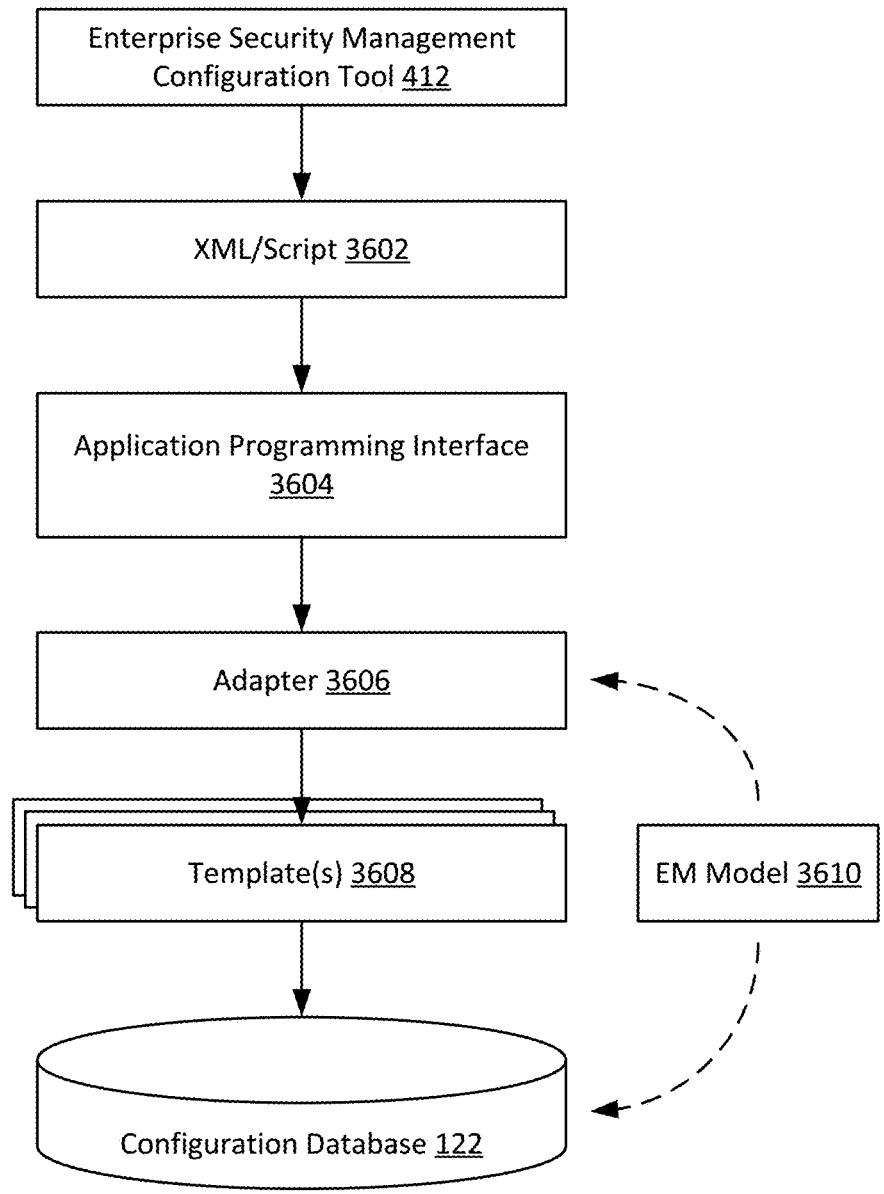
FIG. 36 illustrates a data flow from an enterprise security management configuration tool useable for import into a configuration database managed by an enterprise management server, according to an example embodiment.
Figure 37:
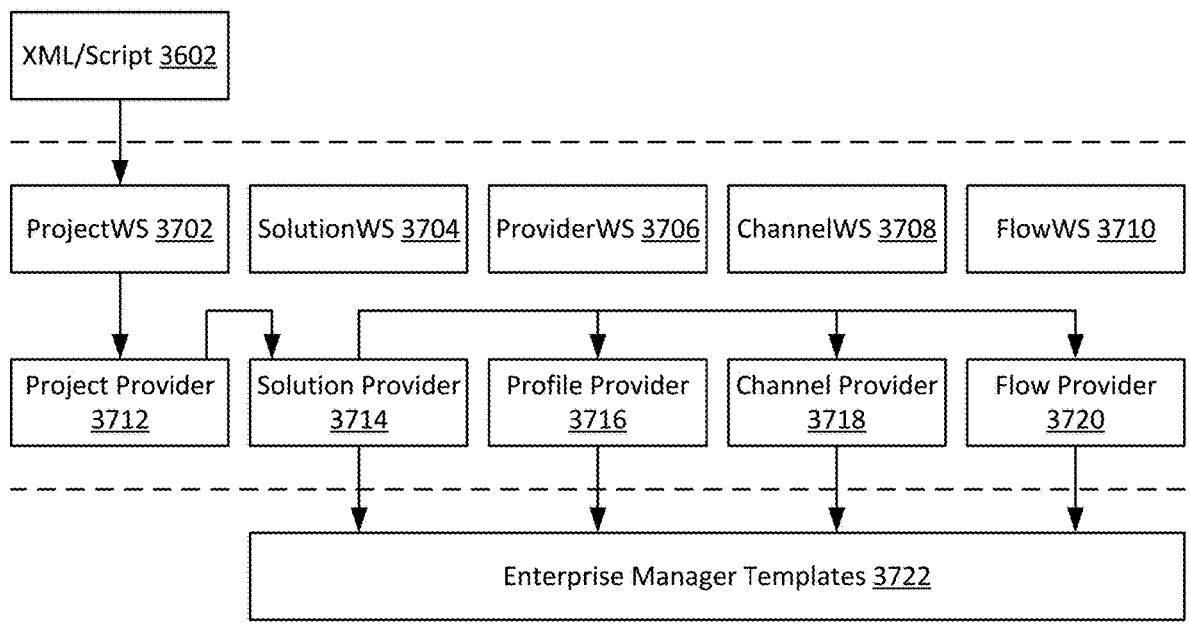
FIG. 37 illustrates details regarding data processing within an enterprise management server exposing an application programming interface configured to ingest a security policy settings file from the enterprise security management configuration tool, according to an example embodiment.

Referring now to FIGS. 35-37, details regarding deployment or export of a configuration developed in the enterprise security management configuration tool are described. Generally, the projects and solutions as defined using such a tool, as described above, must be exported for use by an enterprise management server which can in turn deploy security settings within an enterprise network, as noted above in connection with FIG. 1. Within the enterprise security management configuration tool itself, and as seen in FIG. 35, a user interface 3500 can be displayed for export of a security policy from the tool itself. As illustrated, the user interface allows a user to select one or all solutions included in the currently active project for export.

FIG. 35 is a configuration user interface 3500 of an enterprise security management configuration tool useable to export a security settings file to an enterprise management server, according to an example embodiment. Upon selection of a deployment tool 3502 from the tool palette (e.g., tool palette 802), a window is shown that allows a user to (1) select whether to enforce services in the deployment, and (2) select whether to deploy all or a portion of the currently active project. As to services enforcement, a drop-down option 3504 allows the user to select among enforcement of services, enforcement of IP addresses, enforcement of both IP addresses and services, or neither. Enforcement of services results in generation of filters to enforce local ports as to specific, specified services. Enforcement of IP addresses generates filters to enforce usage of local ports on a particular node as tied to services and addresses of particular profiles. Additionally, every defined solution is depicted in the configuration user interface 3500, allowing a user to select all or a portion of the project for deployment.

Upon selection of a deployment option, the enterprise security management configuration tool will generate an output security settings file, in the form of an XML-based file that can be ingested by an enterprise management server, such as server 120 of FIG. 1, for storage of filters and settings in a configuration database 122, and for distribution to nodes within the enterprise network (by the enterprise management server).

Referring to FIG. 36, a specific data flow 3600 is illustrated, showing export of such an XML-based file from the enterprise security management configuration tool to a configuration database of an enterprise management server. In the example shown, enterprise security management configuration tool 412 outputs an XML-based file 3602 that is compliant with an application programming interface (API) 3604 that is published by the enterprise management server. The API 3604 defines separate resources for each of a project, a solution, a profile, a channel, a flow, and includes request status messages as well. Details regarding processing of each of these API components are described in further detail below in connection with FIG. 37. However, once ingested and parsed, the XML file, which designates security settings in terms of such profiles, solutions, and nodes, can be converted to an arrangement useable by the enterprise management server, which does not necessarily use the same logical arrangement of devices. Rather, in an enterprise management server, specific domains, endpoints, communities of interest, or other sub-divisions of an enterprise network may be managed. Accordingly, an adapter 3606 converts the security policy settings such that they are mapped to appropriate network resources, according to the layout of the enterprise network (which is maintained and managed in the enterprise management model 3610, described in detail in U.S. patent application Ser. No. 14/688,348, entitled 'Enterprise Management for Secure Network Communications over IPSec", the disclosure of which was previously incorporated by reference).

In the embodiment shown, one or more templates 3608 receive objects extracted from the XML-based file 3602 from the adapter, to process the security settings received in that file. The templates 3608 can feed data that is mapped to the configuration database objects directly into the configuration database 122 for distribution within the enterprise network.

FIG. 37 illustrates further details regarding data processing within an enterprise management server exposing an application programming interface 3604 configured to ingest a security policy settings file from the enterprise security management configuration tool, according to an example embodiment. In the example implementation shown in FIG. 37, the XML-based file 3602 is received at the API 3604, and the file is routed to a project resource. The project resource is a container of multiple solutions, including a project 3702, a solution 3704, a provider 3706, a channel 3708, and a flow 3710, and provides a mechanism to pass the collection of solutions (shown as solutions 3704-3710) as a single XML. The solutions, and their channels and flows, are extracted from the XML and passed to their respective providers (3712-3720, respectively) for farther processing. In the hierarchy of the XML file, the project contains solutions, and the solution contains descriptions of the profiles, channels and flows. For example, a digestible XML file could take the format:

```
<?xml version="1.0" encoding="UTF-8" standalone="true"?>
  <project>
    <solution>
      <id>SolutionID</id>
      <name>test-Profile </name>
      <description>Description</description>
      <profiles>
        <profile>
        <id>ProfileID</id>
        <name>test-Profile </name>
        <description>ProfileDescription</description>
        <enabled>true</enabled>
        <stealthPolicy>1</stealthPolicy>
        <clearTextPolicy>unknown</clearTextPolicy>
        <enforcement>1</enforcement>
        <groupName>GroupID</groupName>
        <ipAddresses>
```

-continued

```
        <ipAddress>80.63.99.139</ipAddress>
      </ipAddresses>
    </profile>
    ...
    <channels>
      <channel>
        <id>ChannelID</id>
        <name>test-Channel </name>
        <description>Description</description>
        <policy>0</policy>
        <coiName>test-COI</coiName>
        <primaryProfileId>ProfileID</primaryProfileId>
        <secondaryProfileId>SecondaryID</secondaryProfileId>
      </channel>
      ...
      <flows>
        <flow>
          <id>FlowID</id>
          <name>test-Flow </name>
          <description>Description</description>
          <enabled>true</enabled>
          <policy>allowClearText</policy>
          <provisioningFlow>false</provisioningFlow>
          <accessPoint>
            <port>24803</port>
            <protocol>UDP</protocol>
          </accessPoint>
          <consumerProfileId>ConsumerID</consumerProfileId>
          <providerProfileId>ProviderID</providerProfileId>
        </flow>
        ...
      </flows>
      ...
    </solution>
    ...
</project>
```

Such a file can be parsed and separated, with the various portions routed to appropriate providers for purposes of writing to enterprise manager templates 3722, which map directly to data fields in a configuration database of the enterprise management server (e.g., configuration database 122 of management server 120).

It is noted that although the enterprise security management configuration tool separates projects into solutions, profiles, nodes, channels, and flows, these may not have a direct relationship to corresponding objects in a configuration database. As such, the API 3704 is configured to receive data in the format known by the enterprise security management configuration tool, but convert that data to be known in the configuration database.

Referring to FIGS. 1-37 generally, it is noted that the present disclosure provides substantial advantages over existing configuration tools, including, for example, by providing automated analysis of captured network traffic and using that traffic to assist in informing the security configuration tools to set appropriate security parameters based on observations regard ng network traffic; furthermore, the selection of policies can be made on a flow-by-flow analysis, to selectively block, allow, or secure each traffic flow. Furthermore, policy objects can be created automatically that can be propagated to the configuration database, and automatically deployed to nodes included in the selected solutions.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method of configuring security management settings within an enterprise network, the method comprising:
receiving network concordance data at an enterprise security management configuration tool from a plurality of nodes within an enterprise network, the network concordance data including network traffic data regarding identities and interactions of the plurality of nodes;
based on the network concordance data, classifying, by the enterprise security management configuration tool, each of the plurality of nodes, wherein classifying each of the plurality of nodes includes grouping at least some of the plurality of nodes into profiles based on an affinitization among the plurality of nodes determined from the network concordance data, each of the profiles including a group of nodes and describing common security settings for operation and interactivity within the enterprise network for the group of nodes;
defining one or more solutions within the enterprise security management configuration tool, the one or more solutions including a plurality of profiles;
receiving a deployment selection identifying at least one of the one or more solutions; and
in response to the deployment selection, generating a security settings file describing security settings for operation and interactivity of each of the one or more nodes included in the identified one or more solutions, wherein the security settings file is configured for import by an enterprise management server to populate an enterprise management database, the security settings file conforming to an application programming interface exposed by the enterprise management server.

2. The method of claim 1, wherein at least one solution includes a plurality of grouped nodes based on an affinitization determined from the network concordance data, and wherein generating the security settings file includes defining common security settings for each node within the plurality of grouped nodes.

3. The method of claim 1, wherein classifying each of the plurality of nodes includes grouping two or more of the plurality of nodes based on the two or more of the plurality of nodes having an affinitization above a predetermined affinitization level.

4. The method of claim 1, further comprising capturing, from each of the plurality of nodes, the network concordance data, wherein the network concordance data is derived from network traffic captured at each of the plurality of nodes.

5. The method of claim 4, further comprising installing at one or more of the plurality of nodes a network traffic monitoring agent configured to collect network concordance data.

6. The method of claim 1, wherein classifying each of the plurality of nodes comprises forming a plurality of groups.

7. The method of claim 6, further comprising defining a different profile for each of the plurality of groups.

8. The method of claim 1, wherein defining one or more solutions includes logically associating two or more profiles within a solution.

9. The method of claim 1, further comprising importing the security settings file into an enterprise management database defining an enterprise security topology.

10. A system comprising:
an enterprise security management configuration server comprising:
a programmable circuit;
a memory storing computer-executable instructions that, when executed by the programmable circuit, cause the enterprise security management configuration server to:
receive network concordance data at an enterprise security management configuration tool, the network concordance data including network traffic data regarding identities and interactions of a plurality of nodes;
based on the network concordance data, classify, by the enterprise security management configuration tool, each of the plurality of nodes, wherein classifying each of the plurality of nodes includes grouping at least some of the plurality of nodes into profiles based on an affinitization among the plurality of nodes determined from the network concordance data, each of the profiles including a group of nodes and describing common security settings for operation and interactivity within the enterprise network for the group of nodes;
define one or more solutions within the enterprise security management configuration tool, the one or more solutions including a plurality of profiles;
receive a deployment selection identifying at least one of the one or more solutions; and
in response to the deployment selection, generate a security settings file describing security settings for operation and interactivity of each of the one or more nodes included in the identified one or more solutions;
wherein the security settings file is configured for import by an enterprise management server to populate an enterprise management database, the security settings file conforming to an application programming interface exposed by the enterprise management server.

11. The system of claim 10, further comprising the enterprise management server, wherein the enterprise management server is communicatively connected to the enterprise security management configuration server, the enterprise management server including the enterprise management database storing security settings for nodes within the enterprise network.

12. The system of claim 11, further comprising a plurality of nodes communicatively connected to the enterprise network including the enterprise security management configuration server and the enterprise management server.

13. The system of claim 10, further comprising a plurality of monitoring agents installable at nodes within the enterprise network, the plurality of monitoring agents configured to capture network traffic data originating from or addressed to nodes within the enterprise network.

14. The system of claim 13, wherein the network traffic data is included in the network concordance data received at the enterprise security management configuration tool.

15. The system of claim 10, wherein the enterprise security management configuration server is integrated with the enterprise management server.

16. The system of claim 10, wherein the enterprise security management configuration server includes a display, and wherein the enterprise security management configuration server is configured to generate a configuration user interface including one or more predefined solutions.

17. The system of claim 16, wherein the configuration user interface includes a plurality of predefined solutions, the predefined solutions including an intranet solution, an internet solution, an infrastructure solution, and an enterprise management solution.

18. The system of claim 10, wherein the enterprise security management configuration server is configured to create a project in which to create the security settings file.

19. A non-transitory computer-readable storage device having computer-executable instructions stored thereon which, when executed by a computing system, cause the computing system to perform:
creating a project in a user interface of an enterprise security management configuration tool;
receiving network concordance data at the enterprise security management configuration tool from a plurality of nodes within an enterprise network, the network concordance data including network traffic data regarding identities and interactions of the plurality of nodes;
based on the network concordance data, classifying, by the enterprise security management configuration tool, each of the plurality of nodes, wherein classifying each of the plurality of nodes includes grouping at least some of the plurality of nodes into profiles based on an affinitization among the plurality of nodes determined from the network concordance data, each of the profiles including a group of nodes and describing common security settings for operation and interactivity within the enterprise network for the group of nodes;
defining one or more solutions within the enterprise security management configuration tool, the one or more solutions including a plurality of profiles;
receiving a deployment selection identifying at least one of the one or more solutions;
in response to the deployment selection, generating a security settings file describing security settings for operation and interactivity of each of the one or more nodes included in the identified one or more solutions; and
exporting the security settings file to an enterprise management database of an enterprise management server, wherein the security settings file is configured for import by the enterprise management server to populate an enterprise management database, the security settings file conforming to an application programming interface exposed by the enterprise management server.

* * * * *